(12) United States Patent
Tamura

(10) Patent No.: US 12,202,297 B2
(45) Date of Patent: Jan. 21, 2025

(54) PNEUMATIC TIRE

(71) Applicant: The Yokohama Rubber Co., LTD., Tokyo (JP)

(72) Inventor: Masashi Tamura, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 631 days.

(21) Appl. No.: 17/310,656

(22) PCT Filed: Nov. 25, 2019

(86) PCT No.: PCT/JP2019/046039
§ 371 (c)(1),
(2) Date: Aug. 16, 2021

(87) PCT Pub. No.: WO2020/170537
PCT Pub. Date: Aug. 27, 2020

(65) Prior Publication Data
US 2021/0387477 A1  Dec. 16, 2021

(30) Foreign Application Priority Data

Feb. 19, 2019  (JP) ................................. 2019-027811

(51) Int. Cl.
*B60C 11/01*  (2006.01)
*B60C 11/03*  (2006.01)
*B60C 11/13*  (2006.01)

(52) U.S. Cl.
CPC .......... *B60C 11/01* (2013.01); *B60C 11/0311* (2013.01); *B60C 11/1376* (2013.01);
(Continued)

(58) Field of Classification Search
CPC ................. B60C 11/01; B60C 11/0311; B60C 2011/0367
See application file for complete search history.

(56) References Cited

U.S. PATENT DOCUMENTS

2004/0211502 A1* 10/2004 Ono ........................ B60C 11/00
152/209.27
2010/0043934 A1  2/2010 Harvey
(Continued)

FOREIGN PATENT DOCUMENTS

JP     03-086603 A  *  4/1991
JP   2000-103206 A     4/2000
(Continued)

OTHER PUBLICATIONS

Machine translation for Japan 03-086603 (Year: 2024).*

*Primary Examiner* — Steven D Maki
(74) *Attorney, Agent, or Firm* — Thorpe North & Western

(57) ABSTRACT

A pneumatic tire includes fins disposed on sidewall surfaces of blocks and extending in a tire circumferential direction. Further, a plane is local and is defined to include a ground contact edge of the first and second blocks and an arc connecting opening end portions of three lug grooves defining the first and second blocks. At this time, the fins of the first and second blocks extend sidewalls of the lug grooves further toward an outer side in a tire width direction than the plane via one circumferential edge portions of the blocks. Furthermore, the projection amount of the fins with respect to the plane tapers from the one circumferential edge portions toward other circumferential edge portions of the blocks.

16 Claims, 18 Drawing Sheets

(52) U.S. Cl.
CPC ............... *B60C 2011/0365* (2013.01); *B60C 2011/0367* (2013.01)

(56) References Cited

U.S. PATENT DOCUMENTS

| | | | | |
|---|---|---|---|---|
| 2013/0220498 A1* | 8/2013 | Kawakami | ............... | B60C 11/01 |
| | | | | 152/209.1 |
| 2015/0007918 A1* | 1/2015 | Hironaka | ................ | B60C 11/12 |
| | | | | 152/209.16 |
| 2019/0315163 A1* | 10/2019 | Takita | .................... | B60C 11/01 |

FOREIGN PATENT DOCUMENTS

| | | |
|---|---|---|
| JP | 2010-47251 A | 3/2010 |
| JP | 2010-132045 A | 6/2010 |
| JP | 2010-188975 A | 9/2010 |
| JP | 5886532 B2 | 3/2016 |
| JP | 2016-88338 A | 5/2016 |
| JP | 2016-215659 A | 12/2016 |
| JP | 2017-124733 A | 7/2017 |
| JP | 2017-190083 A | 10/2017 |
| JP | 2018-16202 A | 2/2018 |

* cited by examiner

A-CROSS-SECTIONAL VIEW

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| Fins of Buttress Portion | No | Yes | Yes | Yes | Yes | Yes | Yes | Yes |
| Da/Lb | — | 0.10 | 0.50 | 0.50 | 0.50 | 0.80 | 0.80 | 0.80 |
| Da[mm] | — | 51 | 45 | 40 | 40 | 40 | 45 | 51 |
| D2/Hg | — | 0.10 | 0.20 | 0.20 | 0.20 | 0.50 | 0.50 | 0.50 |
| Hf_max[mm] | — | 1.0 | 5.0 | 10 | 20 | 30 | 40 | 50 |
| Lf/Lb | — | 0.30 | 0.50 | 0.50 | 0.50 | 0.80 | 0.80 | 0.80 |
| Wf_min/Wf_max | — | 0.30 | 0.50 | 0.50 | 0.50 | 1.00 | 1.00 | 1.00 |
| Di/Lb | — | 0.10 | 0.20 | 0.20 | 0.20 | 0.50 | 0.50 | 0.50 |
| Cooling performance | 100 | 103 | 108 | 108 | 110 | 115 | 120 | 130 |
| Uneven wear resistance | 100 | 99 | 99 | 98 | 98 | 97 | 96 | 95 |

FIG. 22

CONVENTIONAL EXAMPLE

PNEUMATIC TIRE

TECHNICAL FIELD

The technology relates to a pneumatic tire and particularly relates to a pneumatic tire with improved cooling performance of a tread portion.

BACKGROUND ART

Heavy duty tires, in particular, tires for construction vehicles, have a problem in that the tread portion generates heat when the vehicle is traveling, and separation occurs. Conventional pneumatic tires that address this need are described in Japan Patent No. 5886532 and Japan Unexamined Patent Publication No. 2010-132045. The conventional pneumatic tires include fins or recess/protrusion portions in a buttress portion to increase the surface area of the buttress portion, and thus heat dissipation from the buttress portion is facilitated.

SUMMARY

A pneumatic tire according to an embodiment of the technology includes: a plurality of lug grooves extending in a tire width direction and opening to a buttress portion; and first and second blocks that are adjacent to each other with each one of the lug grooves sandwiched therebetween, the pneumatic tire includes fins each disposed on a sidewall surface of the block and extending in a tire circumferential direction, a plane X is defined that is local and includes a ground contact edge of the first and second blocks and an arc connecting opening end portions of the three lug grooves that define the first and second blocks, the fin of each of the first and second blocks extends a groove wall of the lug groove further toward an outer side in the tire width direction than the plane X via one circumferential edge portion of the block, and a projection amount of the fin with respect to the plane X tapers from the one circumferential edge portion to an other circumferential edge portion of the block.

In the pneumatic tire according to an embodiment of the technology, when the tire is rotating, the air on the sidewall surface of the first block on the ground contact leading side is guided by the fin to flow toward the second block on the ground contact trailing side. At this time, since the projection amount of the fin tapers from the ground contact leading side toward the ground contact trailing side of the block, separation of the air flow from the sidewall surface of the fin is suppressed, and the air is efficiently guided. Then, a portion of the air contacts the groove wall of the lug groove between the blocks to flow into the lug groove. At this time, since the fin of the second block extends the groove wall of the lug groove toward an outer side in the tire width direction via the ground contact leading side circumferential edge portion of the block, the inflow of air into the lug groove is facilitated by the extended portion of the groove wall. Accordingly, it is advantageous that the tread portion of the tire is efficiently cooled and thus the increase in the temperature of the tire is effectively suppressed.

BRIEF DESCRIPTION OF DRAWINGS

FIG. 22 is a table indicating the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
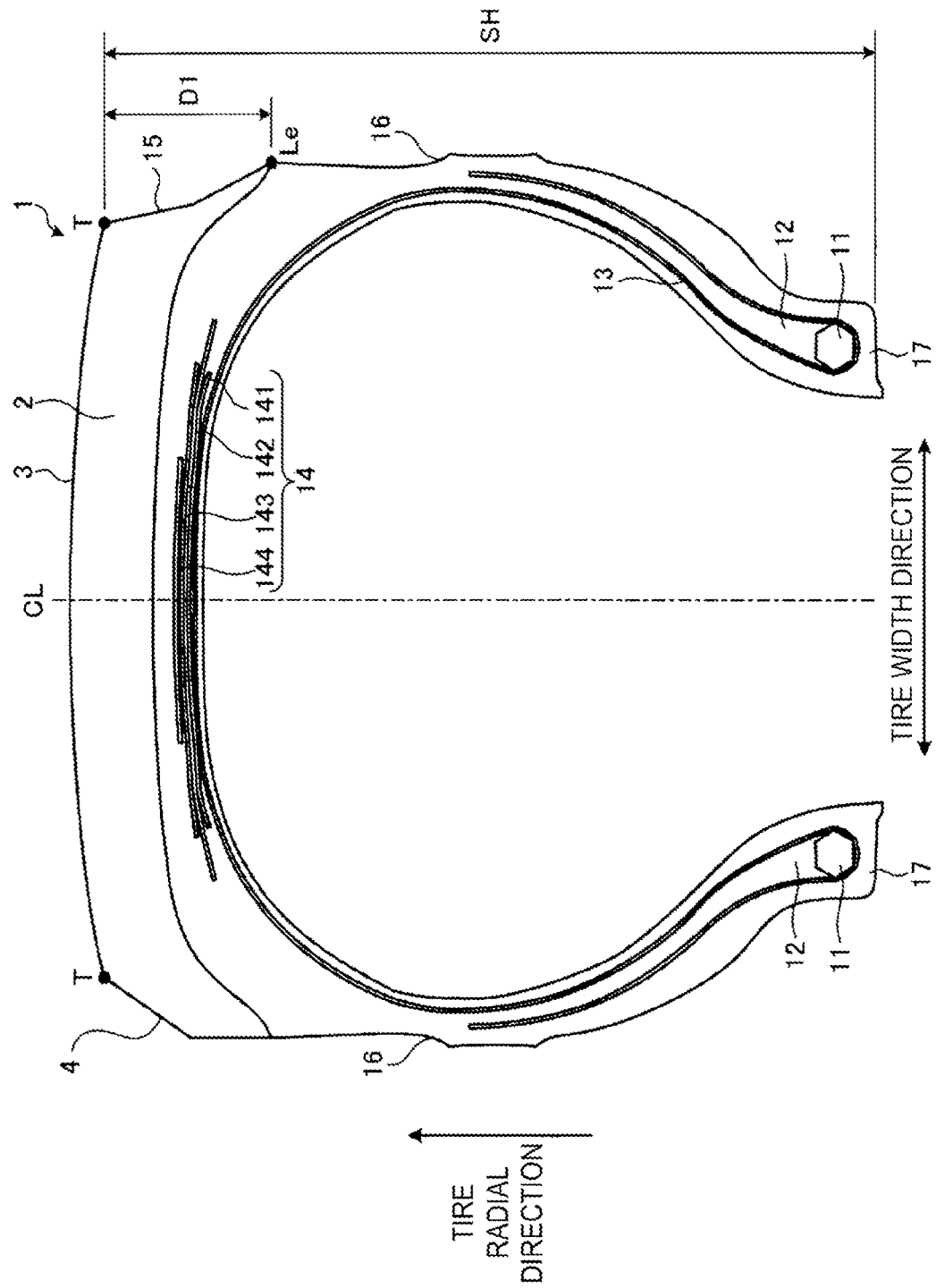
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction taken along lug grooves, and also illustrates a tire for a construction vehicle, which is referred to as an off-the-road tire (OR tire), as an example of a pneumatic tire.

Note that in reference to the same drawing, "cross-section in the tire meridian direction" refers to a cross-section of the tire taken along a plane that includes the tire rotation axis (not illustrated). A reference sign CL denotes a tire equatorial plane and refers to a plane perpendicular to the tire rotation axis that passes through the center point of the tire in a tire rotation axis direction. "Tire width direction" refers to the direction parallel with the tire rotation axis. "Tire radial direction" refers to the direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 include one or a plurality of bead wires made of steel and wound up in an annular shape and multiple times, and configure cores of left and right bead portions. The pair of bead fillers 12, 12 are respectively disposed on an outer circumference of the pair of bead cores 11, 11 in the tire radial direction and reinforce the bead portions.

The carcass layer 13 has a single layer structure made of one carcass ply or a multilayer structure made of a plurality of carcass plies being layered and extends between the left and right bead cores 11, 11 in a toroidal shape, forming the framework of the tire. Additionally, both end portions of the carcass layer 13 are wound and turned back toward an outer side in the tire width direction so as to wrap the bead cores 11 and the bead fillers 12 and fixed. Additionally, the carcass ply of the carcass layer 13 is formed by covering, with coating rubber, a plurality of carcass cords made of steel and performing a rolling process on the carcass cords. The carcass ply of the carcass layer 13 has a cord angle (defined as the inclination angle in the longitudinal direction of the carcass cords with respect to the tire circumferential direction) of 80° or more and 90° or less as an absolute value for a radial tire and 30° or more and 45° or less as an absolute value for a bias tire.

The belt layer 14 includes a plurality of belt plies 141 to 144 in a multilayer, and is disposed wound up on the outer circumference of the carcass layer 13. For example, (1) in a radial tire, three to eight belt plies are layered to form the belt layer 14 (not illustrated). Further, each of the belt plies 141 to 144 is formed by covering a steel cord with coating rubber and performing a rolling process on the steel cord. Furthermore, each of the belt plies 141 to 144 has a cord angle of an opposite sign with respect to the adjacent belt ply, and the belt plies are layered such that the inclination directions of the belt cords are reversed alternately left and right. Thus, a cross-ply structure is formed to increase the structural strength of the belt layer 14. Also, (2) in a bias tire, two or more belt plies are layered to form the belt layer 14 (not illustrated). In addition, each of the belt plies is formed of the aforementioned steel cord or fabric.

The tread rubber 15 is disposed on the outer circumference of the carcass layer 13 and the belt layer 14 in the tire radial direction and constitutes a tread portion of the tire. The pair of sidewall rubbers 16, 16 are disposed on the outer side in the tire width direction of the carcass layer 13 and constitute left and right sidewall portions. The pair of rim cushion rubbers 17, 17 are disposed on an inner side in the tire radial direction of the turned back portions of the carcass layer 13 and the left and right bead cores 11, 11 to form a rim-fitting surface of the bead portion.

Buttress Portion of Tire

Figure 2:
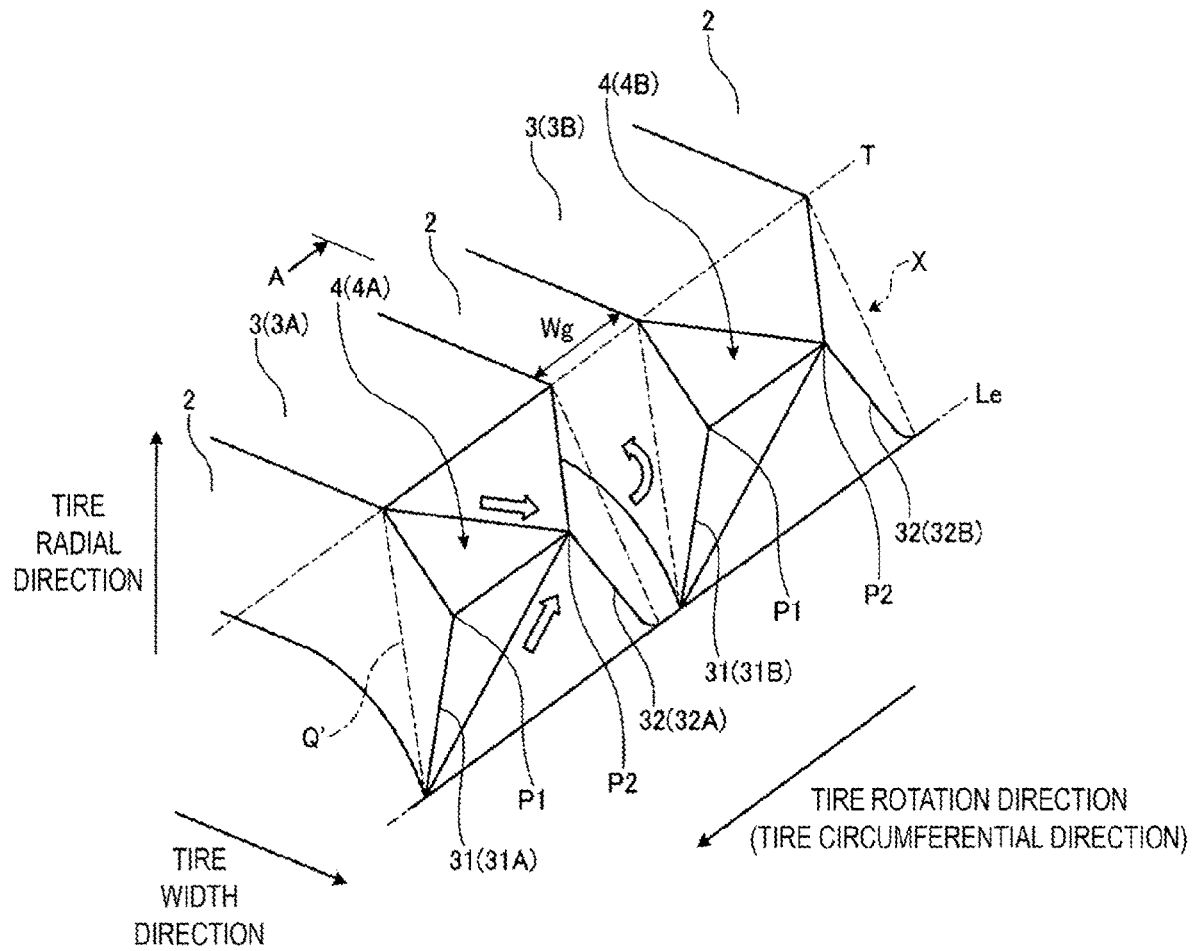
FIG. 2 is a perspective view illustrating a buttress portion of the pneumatic tire illustrated in FIG. 1.
Figure 3:
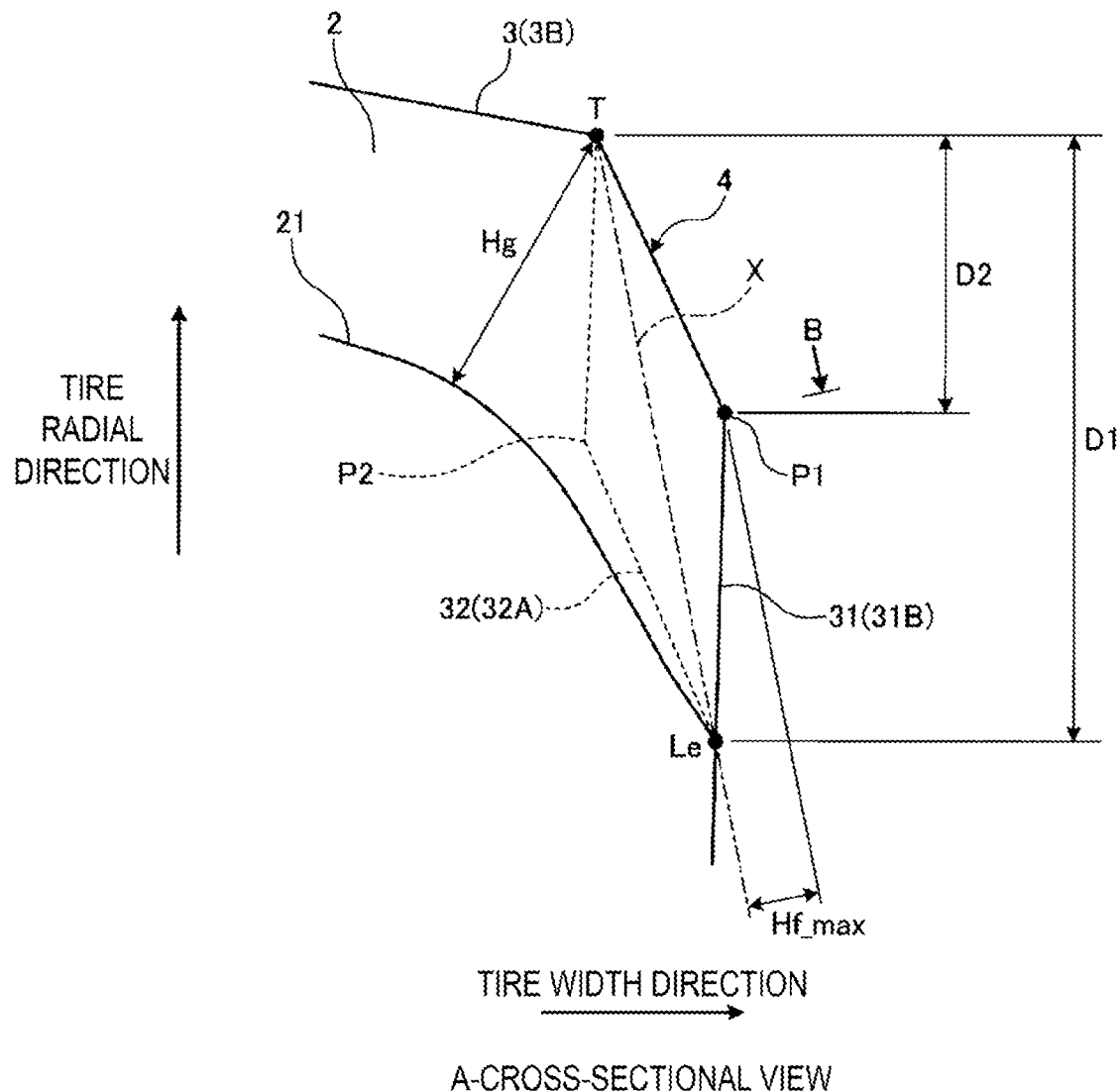
FIG. 3 is a cross-sectional view along arrow A illustrating the buttress portion illustrated in FIG. 2.

FIG. 2 is a perspective view illustrating a buttress portion of the pneumatic tire illustrated in FIG. 1. FIG. 3 is a cross-sectional view along arrow A illustrating the buttress portion illustrated in FIG. 2. These drawings illustrate the buttress portion in one shoulder region.

The buttress portion is defined as a non-ground contacting region formed in a connection portion between the profile of the tread portion and the profile of the sidewall portion, and configures a sidewall surface on an outer side of a shoulder land portion (blocks 3 in FIG. 2) in the tire width direction.

Further, the tire rotation direction illustrated in FIG. 2 is defined as a rotation direction frequently used when the tire is in use and more specifically as a rotation direction when a vehicle travels forward. Furthermore, the ground contact leading side (so-called leading side or toe side) and the ground contact trailing side (so-called trailing side or heel side) of the block when the tire comes into contact with the ground are defined by the tire rotation direction. In addition, the pneumatic tire includes a rotation direction indicator portion (not illustrated) that indicates the tire rotation direction. The rotation direction indicator portion is formed, for example, of a mark or recesses/protrusions provided on the sidewall portion of the tire.

As illustrated in FIG. 2, the pneumatic tire 1 includes a plurality of lug grooves 2 and a plurality of blocks 3 (3A, 3B).

The lug grooves 2 are so-called shoulder lug grooves, extending in the tire width direction in the shoulder region of the tread portion, and open to the buttress portion of the tire beyond a tire ground contact edge T. Additionally, the plurality of lug grooves 2 are arranged at a predetermined pitch in the tire circumferential direction. In the configuration illustrated in FIG. 2, the plurality of lug grooves 2 terminate at the same position in the tire radial direction in the buttress portion of the tire. However, no such limitation is intended, and so-called decorative grooves may be formed in the buttress portion to be connected to the lug grooves 2 (not illustrated).

Further, a groove width Wg of the lug groove 2 at the tire ground contact edge T (see FIG. 2) is preferably in the range 10 mm≤Wg≤200 mm, and more preferably in the range 30 mm≤Wg≤100 mm. Furthermore, a groove depth Hg (see FIG. 3) of the lug groove 2 at the tire ground contact edge T is preferably in the range 20 mm≤Hg≤180 mm, and more preferably in the range 50 mm≤Hg≤120 mm. Note that reference sign 21 in FIG. 3 denotes a groove bottom of the lug groove 2.

The groove width is measured as a distance between left and right groove walls at a groove opening portion when the tire is mounted on a specified rim, inflated to the specified internal pressure, and in an unloaded state. In a configuration in which the land portion includes a notch portion or a chamfered portion on an edge portion thereof, the groove width is measured with intersection points between the tread contact surface and extension lines of the groove walls as measurement points, in a cross-sectional view with the groove length direction as a normal line direction.

The groove depth is the distance from the tread contact surface to the groove bottom and is measured when the tire is mounted on a specified rim, inflated to the specified internal pressure, and in an unloaded state. Additionally, in a configuration in which the grooves include a partially uneven portion or sipe on the groove bottom, the groove depth is measured excluding these portions.

The tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

Here, "specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a tire for a passenger vehicle, the specified internal pressure is an air pressure of 180 kPa, and the specified load is 88% of the maximum load capacity.

The block 3 is a so-called shoulder block, is defined and formed by the adjacent lug grooves 2, 2, and is disposed on the tire ground contact edge T (see FIG. 2). Further, the plurality of blocks 3 are arranged at a predetermined pitch in the tire circumferential direction. Furthermore, the pitch number of the blocks 3 preferably ranges from 10 or more to 50 or less, and more preferably ranges from 20 or more to 40 or less.

Here, as illustrated in FIG. 2, a local plane X is defined that includes: a ground contact edge (included in the tire ground contact edge T) of a pair of blocks 3A, 3B adjacent to each other in the tire circumferential direction; and an arc Le connecting opening end portions of the three lug grooves 2 that define the blocks 3A, 3B. The opening end portion of the lug groove 2 is defined as a point on the innermost side in the tire radial direction of the opening portion of the lug groove 2 in the buttress portion.

Additionally, in a cross-sectional view in the tire meridian direction (see FIGS. 1 and 3), a distance D1 in the tire radial direction from the tire ground contact edge T to the arc Le and a tire cross-sectional height SH preferably have the relationship $0.05 \leq D1/SH \leq 0.40$, and more preferably have the relationship $0.10 \leq D1/SH \leq 0.30$. In particular, in a tire for a construction vehicle, the distance D1 is in the range 35 mm≤D1.

The tire cross-sectional height SH is half of a difference between a tire outer diameter and a rim diameter and is measured when the tire is mounted on a specified rim, inflated to a specified internal pressure, and in an unloaded state.

Fins of Buttress Portion

Figure 4:
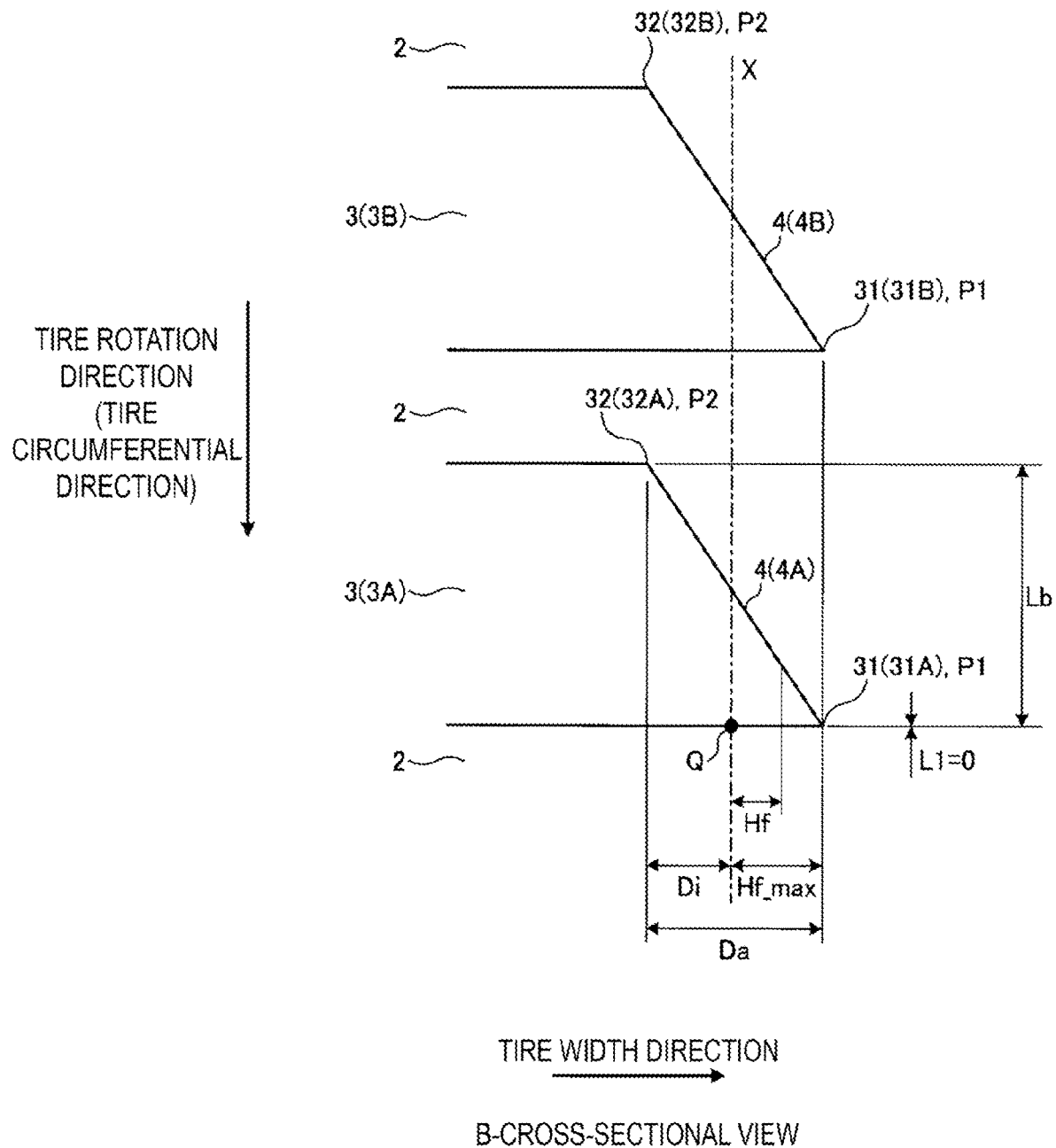
FIG. 4 is an explanatory diagram illustrating fins of the buttress portion illustrated in FIG. 2.
Figure 5:
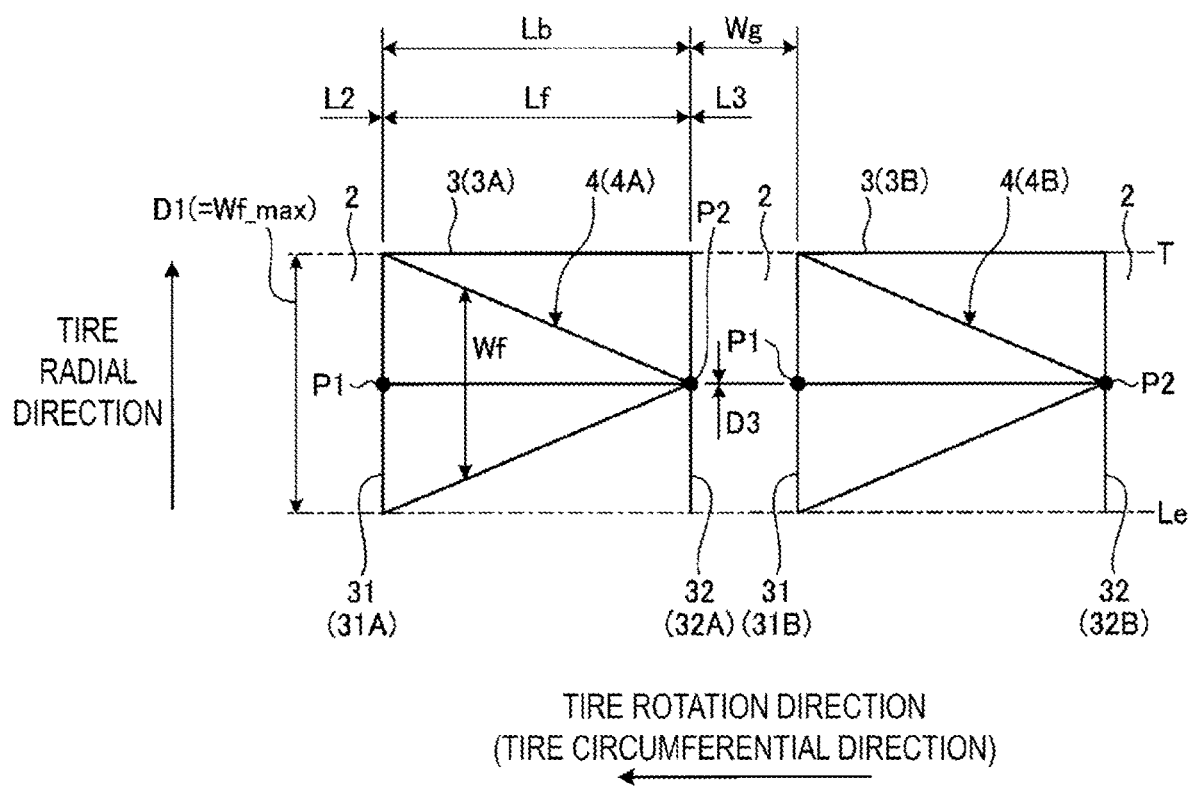
FIG. 5 is an explanatory diagram illustrating the fins of the buttress portion illustrated in FIG. 2.

FIGS. 4 and 5 are explanatory diagrams illustrating fins of the buttress portion illustrated in in FIG. 2. In these drawings, FIG. 4 illustrates a cross-sectional view along arrow B in FIG. 3, and FIG. 5 is a plan view of the blocks 3 in a plan view of the plane X.

As illustrated in FIGS. 1 and 2, the pneumatic tire 1 includes a plurality of fins 4 (4A, 4B) in the buttress portion. In the configuration illustrated in FIG. 1, the fins 4 are formed in the left and right buttress portions of the tire. However, the fins 4 are not limited to such a configuration and may be formed on only one of the buttress portions (not illustrated).

Further, as illustrated in FIG. 2, the fin 4 is formed on the sidewall surface of the block 3 (that is, a wall surface of the buttress portion) and extends in the tire circumferential direction. Specifically, the fin 4 is disposed in a region between the tire ground contact edge T and the arc Le described above, which is the sidewall surface of the block 3. Furthermore, the fins 4 are disposed respectively in the plurality of blocks 3 arranged in the tire circumferential direction.

Additionally, as illustrated in FIGS. 2 to 4, an end surface of the fin 4 on the ground contact leading side in the tire rotation direction extends the groove wall of the lug groove 2 further toward the outer side in the tire width direction than the plane X via one circumferential edge portion 31 of the block 3. Specifically, the fin 4 includes a maximum projection position P1 with respect to the plane X on the one circumferential edge portion 31 of the block 3, and the maximum projection position P1 of the fin 4 is located further on the outer side in the tire width direction than the plane X. Additionally, the groove wall in the tire rotation direction of the lug groove 2 on the ground contact trailing side is extended further toward the outer side in the tire width direction than the ground contact leading side groove wall to project into the buttress portion. As a result, a ground contact trailing side circumferential edge portion 32A of the first block 3A is offset to an inner side in the tire width direction with respect to a ground contact leading side circumferential edge portion 31B of the second block 3B. Additionally, in this case, as illustrated in FIGS. 2 and 4, it is preferable that the groove wall of the lug groove 2 is smoothly extended. Specifically, the groove wall of the lug groove 2 and the end surface of the fin 4 are on the same plane and are connected to each other without having a step.

At this time, in a cross-sectional view that includes the maximum projection position P1 of the fin 4 and is perpendicular to the plane X and parallel to the tire circumferential direction (see FIG. 4), a distance Da in the tire width direction from the ground contact trailing side circumferential edge portion 32A of the first block 3A to the maximum projection position P1 of the fin 4B of the second block 3B and a circumferential length Lb (see FIG. 5) of the block 3 at the tire ground contact edge T preferably have the relationship $0.10 \leq Da/Lb \leq 1.50$, and more preferably have the relationship $0.20 \leq Da/Lb \leq 0.80$. In addition, the distance Da preferably has the relationship 5 mm≤Da≤100 mm, and more preferably has the relationship 10 mm≤Da≤60 mm. Accordingly, the offset amount (i.e., the distance Da) between the circumferential edge portions 31, 32 of the block 3 is appropriately set.

Moreover, as illustrated in FIG. 4, a projection amount Hf of the fin 4 with respect to the plane X tapers from the one circumferential edge portion 31 to the other circumferential edge portion 32 of the block 3, and more specifically from the ground contact leading side to the ground contact trailing side of the block 3 in the tire rotation direction. Accordingly, the sidewall surface of the block 3 is inclined toward the inner side in the tire width direction from the ground contact leading side to the ground contact trailing side of the block 3.

The shape of the fin 4 is not particularly limited; however, the fin 4 preferably has a three-dimensional shape such that the cross-sectional area becomes narrower from the one circumferential edge portion 31 to the other circumferential edge portion 32 of the block 3, and in particular, preferably has a pyramid shape, a truncated pyramid shape, a circular cone shape, or a circular truncated cone shape.

In the configuration described above, as illustrated in FIG. 2, when the tire is rotating, air on the sidewall surface of the first block 3A on the ground contact leading side is guided by the fin 4A to flow toward the second block 3B on the ground contact trailing side. At this time, since the projection amount Hf of the fin 4A (see FIG. 4) tapers from the ground contact leading side toward the ground contact trailing side of the block 3A, separation of the air flow from the sidewall surface of the fin 4A is suppressed, and thus the air is efficiently guided. Next, a portion of the air contacts the groove walls of the lug groove 2 between the blocks 3A, 3B and flows into the lug groove 2. At this time, since the fin 4B of the second block 3B extends the groove wall of the lug groove 2 toward the outer side in the tire width direction via the ground contact leading side circumferential edge portion 31B of the block 3B, the inflow of air into the lug groove 2 is facilitated by the extended portion of the groove wall. Accordingly, the tread portion of the tire is efficiently cooled, and the increase in the temperature of the tire is effectively suppressed.

Additionally, in FIG. 3, a distance D2 in the tire radial direction from the tire ground contact edge T to the maximum projection position P1 of the fin 4 preferably has the relationship $0.20 \leq D2/Hg$ with respect to the groove depth Hg of the lug groove 2 at the tire ground contact edge T, and more preferably has the relationship $0.50 \leq D2/Hg$. With the lower limit described above, the distance D2 of the fin 4 to the maximum projection position P1 is ensured, and the effect of guiding air by the fin 4 is ensured. The upper limit of the distance D2 is not particularly limited, but preferably has the relationship $D2/D1 \leq 0.80$ with respect to the distance D1 in the tire radial direction from the tire ground contact edge T to the arc Le. Accordingly, the effect of guiding air by the fin 4 is ensured.

Further, a maximum projection amount Hf_max of the fin 4 with respect to the plane X (see FIG. 3) is preferably in the range $1.0 \text{ mm} \leq Hf\_max \leq 50 \text{ mm}$, and more preferably in the range $5.0 \text{ mm} \leq Hf\_max \leq 30 \text{ mm}$. With the lower limit described above, the maximum projection amount Hf_max of the fin 4 is ensured, and the effect of guiding air by the fin 4 is ensured. In addition, with the upper limit described above, uneven wear of the block 3 caused by the arrangement of the fins 4 is suppressed.

The projection amount Hf of the fin is measured as the maximum value of a distance from the plane X to a contour line of the fin in any cross-section that takes the tire circumferential direction as a normal line direction, and the outer side in the tire width direction with respect to the plane X is defined as positive. The projection amount Hf of the fin takes the maximum value Hf_max in the aforementioned cross-section including the maximum projection position P1. Further, as described below, when the sidewall surface of the block has a recessed shape, the projection amount Hf is negative.

Furthermore, in the cross-sectional view that includes the maximum projection position P1 of the fin 4 and is perpendicular to the plane X and parallel to the tire circumferential direction (see FIG. 4), an intersection point Q between the plane X and the groove wall of the lug groove 2 is defined. At this time, a distance L1 in the tire circumferential direction from the intersection point Q to the maximum projection position P1 of the fin 4; and the maximum projection amount Hf_max of the fin 4 preferably have the relationship $-0.20 \leq L1/Hf\_max \leq 0.20$, and more preferably have the relationship $-0.15 \leq L1/Hf\_max \leq 0.15$. Accordingly, the inclination of the groove wall portion, which is extended by the fin 4, of the lug groove 2 is appropriately set, and thus the inflow of air from the fin 4 into the lug groove 2 is facilitated. Note that the distance L1 is defined such that the tire rotation direction is positive.

Additionally, as illustrated in FIG. 5, it is preferable that a width Wf of the fin 4 tapers from the one circumferential edge portion 31 to the other circumferential edge portion 32 of the block 3, and more specifically from the ground contact leading side to the ground contact trailing side of the block 3 in the tire rotation direction. In other words, both the projection amount Hf and the width Wf of the fin 4 taper from the ground contact leading side toward the ground contact trailing side of the block 3. In such a configuration, the air flow on the sidewall surface of the block 3A is consolidated by the fin 4A toward one point, and thus the air is efficiently guided.

Further, in FIG. 5, a maximum width Wf_max in the tire radial direction of the fin 4 preferably has the relationship $0.50 \leq Wf\_max/D1$ with respect to the distance D1 in the tire radial direction from the tire ground contact edge T to the arc Le, and more preferably has the relationship $0.60 \leq Wf\_max/D1$. Accordingly, the maximum width Wf_max of the fin 4 is ensured, and the effect of guiding air by the fin 4 is ensured. The upper limit of the maximum width Wf_max is not particularly limited; however, the maximum width Wf_max preferably has the relationship $Wf\_max/D1 \leq 1.00$ with respect to the distance D1 in the tire radial direction from the tire ground contact edge T to the arc Le (see FIG. 5). Accordingly, uneven wear of the block 3 caused by the arrangement of the fins 4 is suppressed.

The width Wf of the fin is measured as a width in the tire radial direction of the fin in a plan view of the plane X. Also, the width Wf is measured as a measurement point of a rising portion of the fin with respect to the sidewall surface of the block.

Additionally, in FIG. 5, a distance L2 in the tire circumferential direction between the maximum width position of the fin 4 (reference sign omitted in the drawings) and the maximum projection position P1 of the fin 4 has the relationship $-0.20 \leq L2/Lb \leq 0.20$ with respect to the circumferential length Lb of the block 3 at the tire ground contact edge T, and more preferably has the relationship $-0.10 \leq L2/Lb \leq 0.10$. Accordingly, the shape of the groove wall portion, which is extended by the fin 4, of the lug groove 2 is appropriately set. Note that the distance L2 is defined such that the tire rotation direction is positive.

Further, in FIG. 5, a distance L3 in the tire circumferential direction between a minimum projection position P2 of the fin 4 and the ground contact trailing side circumferential edge portion 32 of the block 3 preferably has the relationship $-0.20 \leq L3/Lb \leq 0$ with respect to the circumferential length Lb of the block 3 at the tire ground contact edge T, and more preferably has the relationship $-0.10 \leq L3/Lb \leq 0$. Accordingly, the shape of the groove wall portion, which is extended by the fin 4, of the lug groove 2 is appropriately set. Note that the distance L3 is defined such that the tire rotation direction is positive.

The minimum projection position P2 of the fin is defined as a point at which a distance from the plane X to the contour line of the fin takes the maximum value in a cross-sectional view that passes through a ground contact trailing side end portion of the fin and takes the tire circumferential direction as a normal line direction.

Furthermore, in FIG. 5, a circumferential length Lf of the fin 4 and the circumferential length Lb of the block 3 at the tire ground contact edge T preferably have the relationship $0.50 \leq Lf/Lb \leq 1.00$, and more preferably have the relationship $0.80 \leq Lf/Lb \leq 1.00$. Accordingly, the circumferential length Lf of the fin 4 is appropriately ensured.

The circumferential length Lf of the fin is measured as a length in the tire circumferential direction from the maximum projection position P1 to the minimum projection position P2 of the fin.

Additionally, in FIG. 5, a distance D3 in the tire radial direction between the minimum projection position P2 of the fin 4A of the block 3A on the ground contact leading side in the tire rotation direction and the maximum projection position P1 of the fin 4B of the block 3B on the ground contact trailing side has the relationship $0 \leq D3/D1 \leq 0.80$ with respect to the distance D1 in the tire radial direction from the tire ground contact edge T to the arc Le, and more preferably has the relationship $0 \leq D3/D1 \leq 0.20$. Accordingly, the inflow of suctioned air of the lug groove 2 is facilitated.

The distance D3 is measured as a distance in the tire radial direction between the maximum projection position P1 and the minimum projection position P2 in a plan view of the plane X.

For example, in the configuration of FIG. 2, each of the blocks 3 (3A, 3B) includes the single fin 4 (4A, 4B). Further, the fin 4 has a triangular pyramid shape such that the cross-sectional area becomes narrower from the ground contact leading side circumferential edge portion 31 toward the ground contact trailing side circumferential edge portion 32 of the block 3. Furthermore, the end surface of the fin 4, that is, the bottom surface of the triangular pyramid shape is located on the ground contact leading side circumferential edge portion 31 of the block 3, and thus the groove wall of the lug groove 2 is extended in the tire width direction. At this time, as illustrated in FIG. 4, the end surface of the fin 4 and the groove wall of the lug groove 2 are on the same plane and are connected without having a step. Additionally, the maximum projection position P1 of the fin 4 is located on the ground contact leading side circumferential edge portion 31 of the block 3. Accordingly, the inflow of air from the end surface of the fin 4 into the lug groove 2 is facilitated.

Further, in the configuration of FIG. 2, ridge lines of the triangular pyramid shapes of the fins 4 have a linear shape and extend parallel in the tire circumferential direction as illustrated in FIG. 5. Furthermore, as illustrated in FIG. 4, the ridge lines of the triangular pyramid shapes of the fins 4 are inclined toward the inner side in the tire width direction from the ground contact leading side toward the ground contact trailing side of the block 3 and intersect the plane X. Accordingly, the projection amount Hf of the fin 4 tapers from the ground contact leading side toward the ground contact trailing side of the block 3 and is negative at the ground contact trailing side circumferential edge portion 32 of the block 3. As a result, the fins 4A, 4B arranged in the tire circumferential direction are arranged in a shark fin shape, and a step is formed between the ground contact trailing side circumferential edge portion 32A of the first block 3A and the ground contact leading side circumferential edge portion 31B of the second block 3B. Accordingly, the inflow of air from the end surface of the fin 4 into the lug groove 2 is facilitated.

Also, in the configuration illustrated in FIG. 2, the fin 4 extends continuously across the entire region of the block 3 in the tire circumferential direction. Accordingly, as illustrated in FIG. 5, the end surface of the triangular pyramid shape of the fin 4 is located at the ground contact leading side circumferential edge portion 31 of the block 3, and the vertex of the triangular pyramid shape of the fin 4 is located at the ground contact trailing side circumferential edge portion 32 of the block 3. As a result, the circumferential length Lf of the fin 4 is set to be large.

Modified Examples

FIGS. 6 to 21 are explanatory diagrams illustrating modified examples of the pneumatic tire illustrated in FIG. 2. In these drawings, same reference signs are applied to constituents that are the same as the aforementioned constituents, and explanations thereof are omitted.

In the configuration of FIG. 2, as illustrated in FIG. 3, the distance D2 in the tire radial direction from the tire ground contact edge T to the maximum projection position P1 of the fin 4 is disposed at a position of approximately 50% with respect to the distance D1 in the tire radial direction from the tire ground contact edge T to the arc Le.

Figure 6:
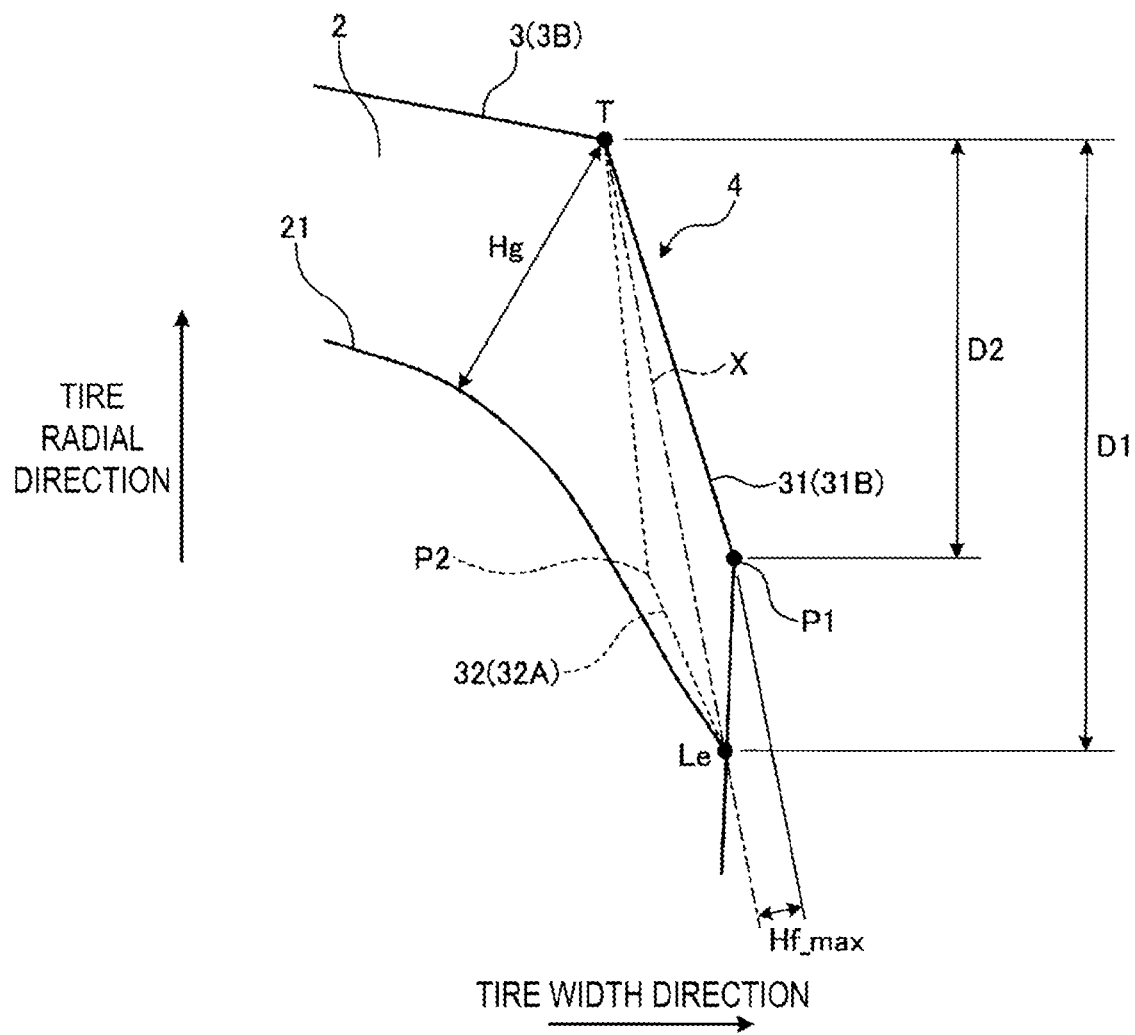
FIG. 6 is an explanatory diagram illustrating a modified example of the pneumatic tire illustrated in FIG. 2.

In contrast, as illustrated in FIG. 6, the maximum projection position P1 of the fin 4 may be disposed at a position 50% or more of the distance D1. Specifically, the distances D1, D2 preferably have the relationship $0.20 \leq D2/D1 \leq 0.80$, and more preferably have the relationship $0.40 \leq D2/D1 \leq 0.60$. As just described, the maximum projection position P1 of the fin 4 is disposed at a position 50% or more of the distance D1, and thus the inflow of air from the fin 4 into the lug groove 2 is facilitated.

In the configuration of FIG. 2, as illustrated in FIG. 4, a portion of the ground contact trailing side circumferential edge portion 32A of the first block 3A is offset to the inner side in the tire width direction with respect to the ground contact leading side circumferential edge portion 31B of the second block 3B located opposed via the lug groove 2. Specifically, the ground contact trailing side circumferential edge portion 32A of the first block 3A is partially recessed at the ground contact trailing side end portion of the fin 4A with respect to the plane X. As a result, the ground contact trailing side end portion of the fin 4A is located further on the inner side in the tire width direction than the plane X. Such a configuration is preferable in that the distance Da in the tire width direction from the ground contact trailing side circumferential edge portion 32A of the first block 3A to the maximum projection position P1 of the fin 4B of the second block 3B is increased and the inflow of air from the fin 4 into the lug grooves 2 is thus facilitated.

Further, in FIG. 4, in the cross-sectional view that includes the maximum projection position P1 of the fin 4 and is perpendicular to the plane X and parallel to the tire circumferential direction, an offset amount Di toward the inner side in the tire width direction from the plane X to the ground contact trailing side circumferential edge portion 32 of the block 3 is preferably in the range $0 \leq Di/Lb \leq 1.00$ with respect to the circumferential length Lb of the block 3 at the tire ground contact edge T, and is more preferably in the range $0.20 \leq Di/Lb \leq 0.50$. Furthermore, the offset amount Di is preferably in the range $-30\ mm \leq Di$ in the actual dimension. With the lower limit described above, uneven wear of the block 3 caused when the offset amount of the circumferential edge portion 32A is excessively large is suppressed. In addition, with the upper limit described above, the offset amount Di is appropriately secured, and thus the inflow of air from the fin 4 into the lug groove 2 is facilitated.

The offset amount Di is measured with a distance from the plane X toward the outer side in the tire width direction regarded as positive.

Figure 7:
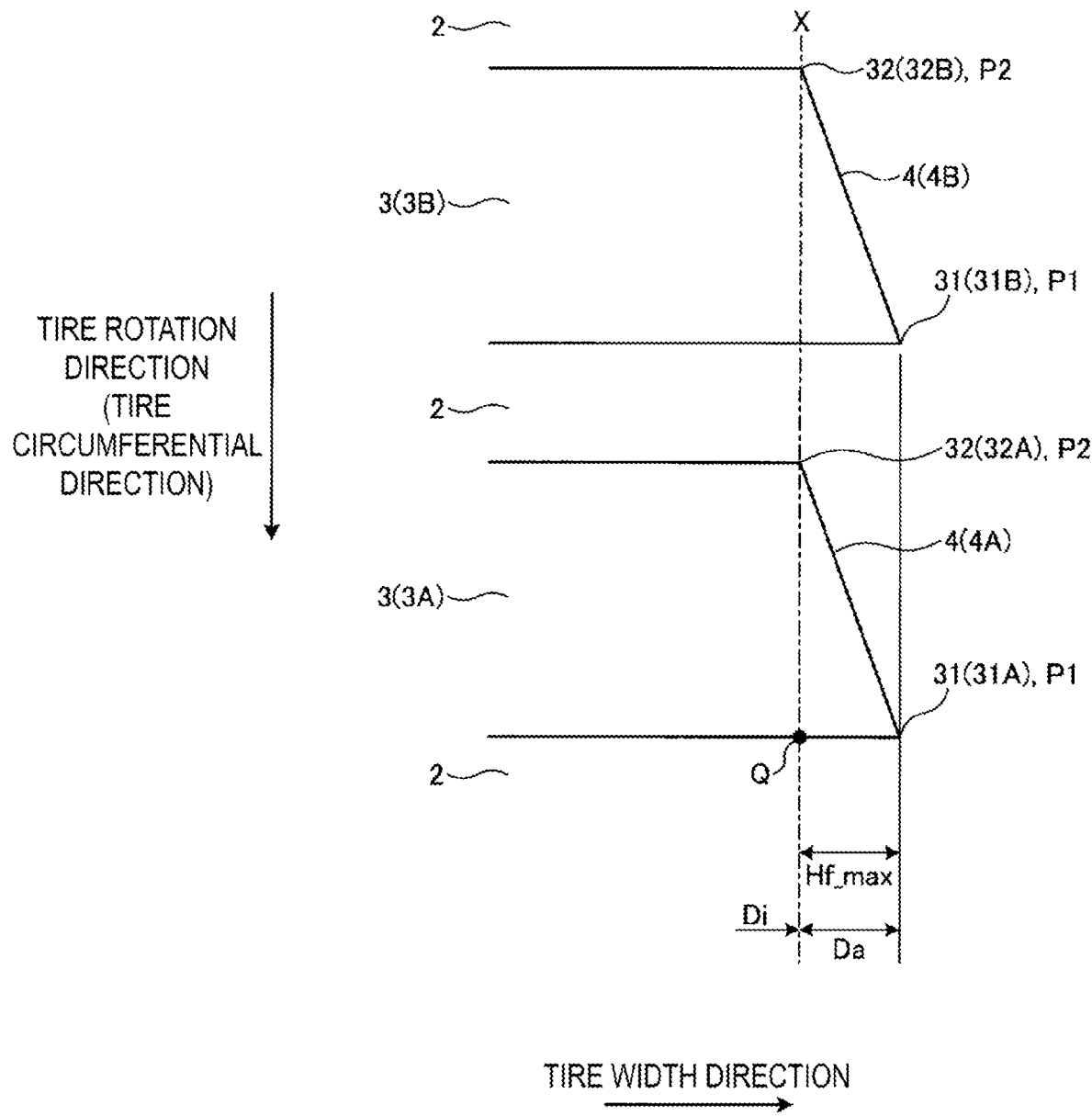
FIG. 7 is an explanatory diagram illustrating a modified example of the pneumatic tire illustrated in FIG. 2.
Figure 8:
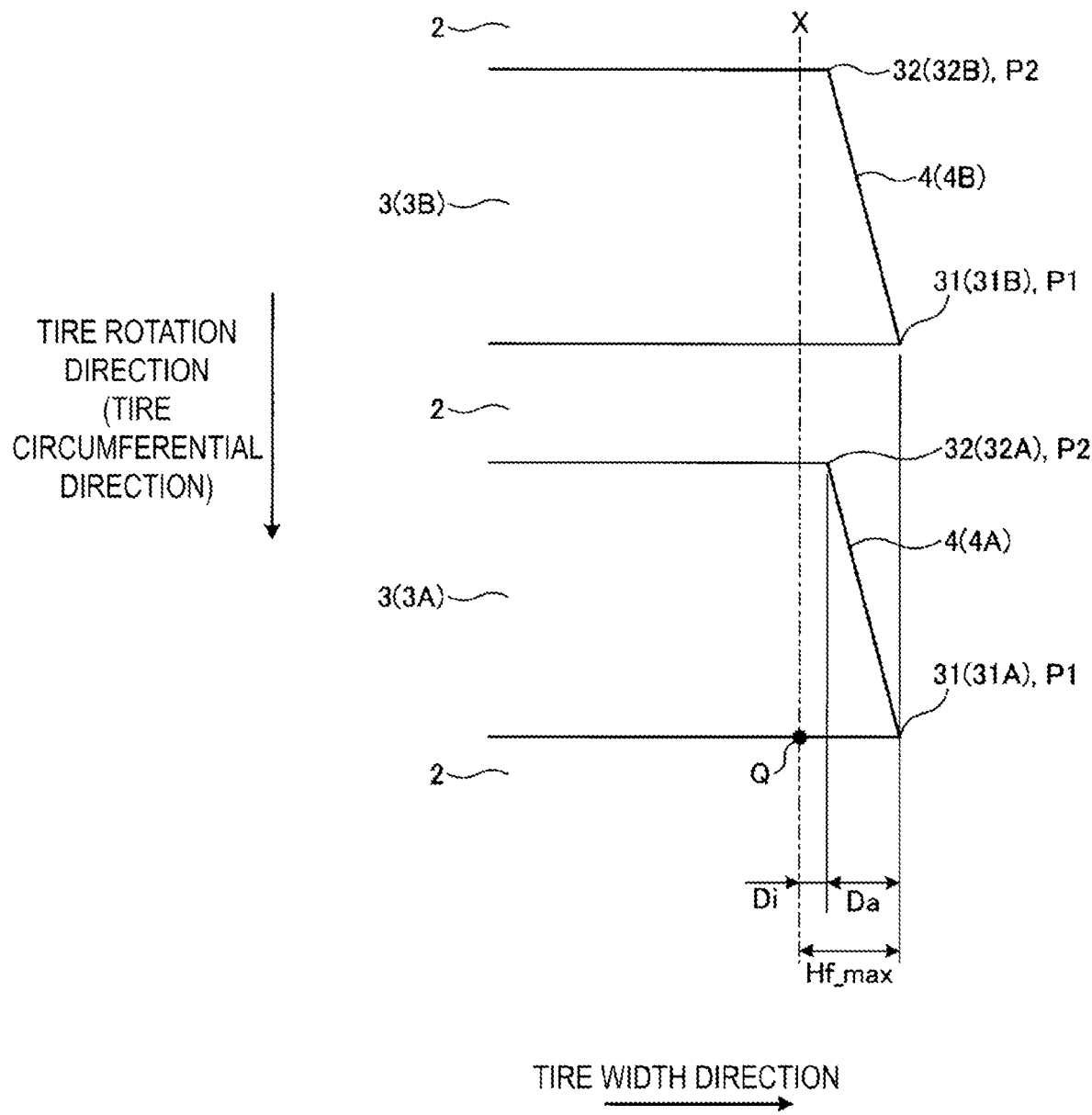
FIG. 8 is an explanatory diagram illustrating a modified example of the pneumatic tire illustrated in FIG. 2.

In contrast, as illustrated in FIGS. 7 and 8, the offset amount Di of the ground contact trailing side circumferential edge portion 32 of the block 3 toward the inner side in the tire width direction may be Di=0 (see FIG. 7) or 0<Di (see FIG. 8). Even with such a configuration, the distance Da in the tire width direction from the ground contact trailing side circumferential edge portion 32A of the first block 3A to the maximum projection position P1 of the fin 4B of the second block 3B is appropriately ensured, and thus the inflow of air from the fin 4 into the lug groove 2 is secured.

Additionally, in the configuration of FIG. 2, the ground contact trailing side groove wall of the lug groove 2 is a flat surface, and as illustrated in FIG. 4, in the cross-sectional view that includes the maximum projection position P1 of the fin 4 and is perpendicular to the plane X and parallel to the tire circumferential direction, the distance L1 in the tire circumferential direction from the intersection point Q between the plane X and the groove wall of the lug groove 2 to the maximum projection position P1 of the fin 4 is L1=0.

Figure 9:
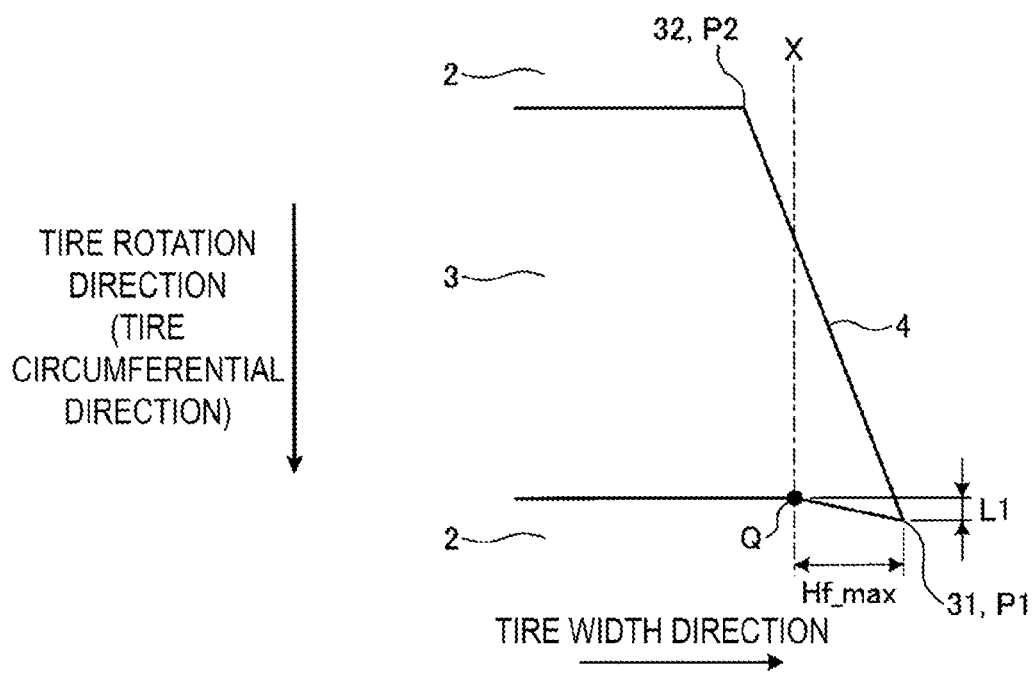
FIG. 9 is an explanatory diagram illustrating a modified example of the pneumatic tire illustrated in FIG. 2.

In contrast, in the configuration of FIG. 9, the maximum projection position P1 of the fin 4 protrudes into the lug groove 2 and is located further on the ground contact leading side in the tire rotation direction than the point Q. Accordingly, the ground contact trailing side groove wall of the lug groove 2 is bent or curved toward the ground contact leading side in the tire rotation direction. As a result, the inflow of air from the fin 4 into the lug groove 2 is facilitated.

Figure 10:
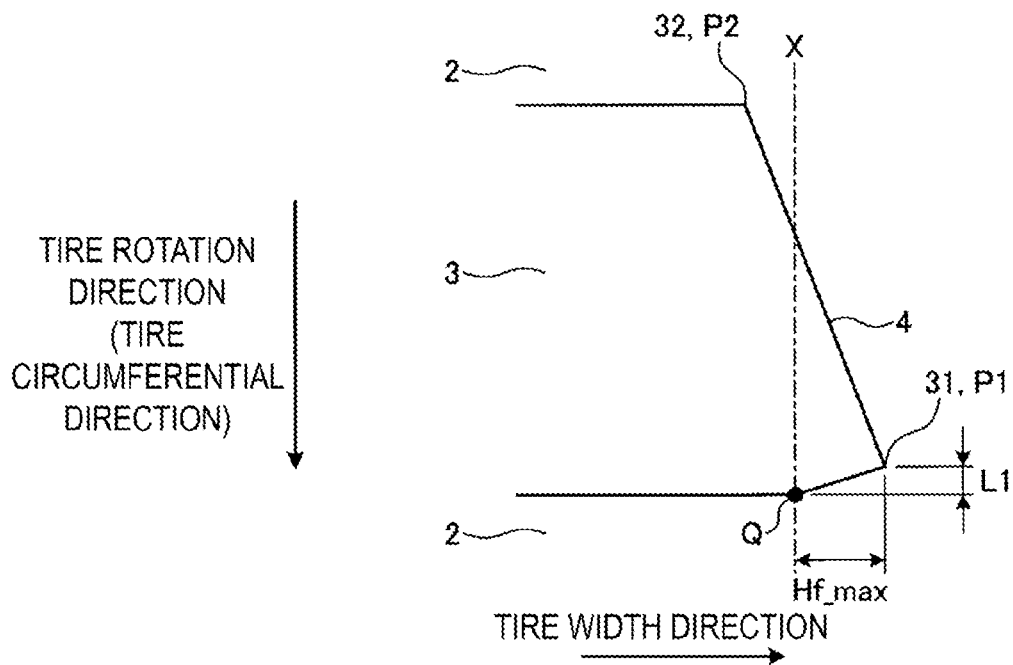
FIG. 10 is an explanatory diagram illustrating a modified example of the pneumatic tire illustrated in FIG. 2.

However, no such limitation is intended. As illustrated in FIG. 10, the maximum projection position P1 of the fin 4 is located further on the ground contact trailing side in the tire rotation direction than the point Q, and thus the ground contact trailing side groove wall of the lug groove 2 may be bent or curved in a direction that increases the groove width. At this time, the ratio L1/Hf_max between the distance L1 in the tire circumferential direction from the intersection point Q to the maximum projection position P1 of the fin 4; and the maximum projection amount Hf_max of the fin 4 is in the range described above, and thus the function of the fin 4 is appropriately ensured.

Figure 11:
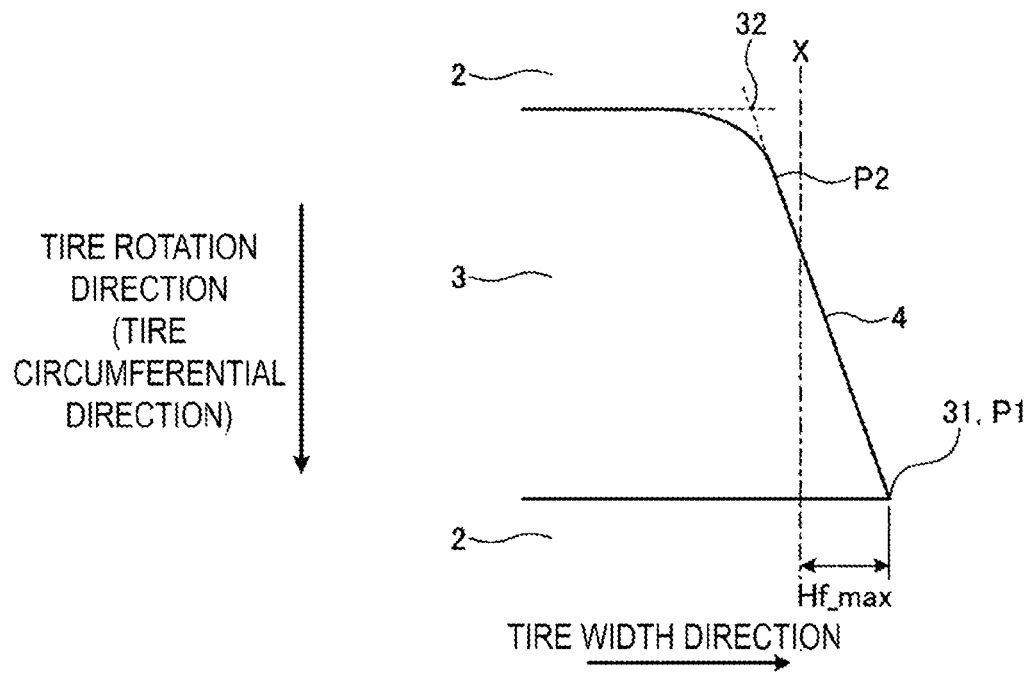
FIG. 11 is an explanatory diagram illustrating a modified example of the pneumatic tire illustrated in FIG. 2.

Additionally, as illustrated in FIG. 11, the ground contact trailing side circumferential edge portion 32 of the block 3 may have a chamfered portion at a connection portion to the groove wall of the lug groove 2. Accordingly, the inflow of air from the fin 4 into the lug groove 2 is facilitated. Note that when the circumferential edge portion 32 is a measurement point in such a configuration, an intersection point between an extension line of the sidewall surface of the block 3 and an extension line of the groove wall of the lug groove 2 is used as the measurement point.

Also, in the configuration of FIG. 2, as illustrated in FIG. 5, the distance L2 in the tire circumferential direction between the maximum width position (reference sign is omitted in the drawings) of the fin 4 and the maximum projection position P1 of the fins 4 is L2=0, and the distance L3 in the tire circumferential direction between the minimum projection position P2 of the fin 4 and the ground contact trailing side circumferential edge portion 32 of the block 3 is L3=0.

Figure 12:
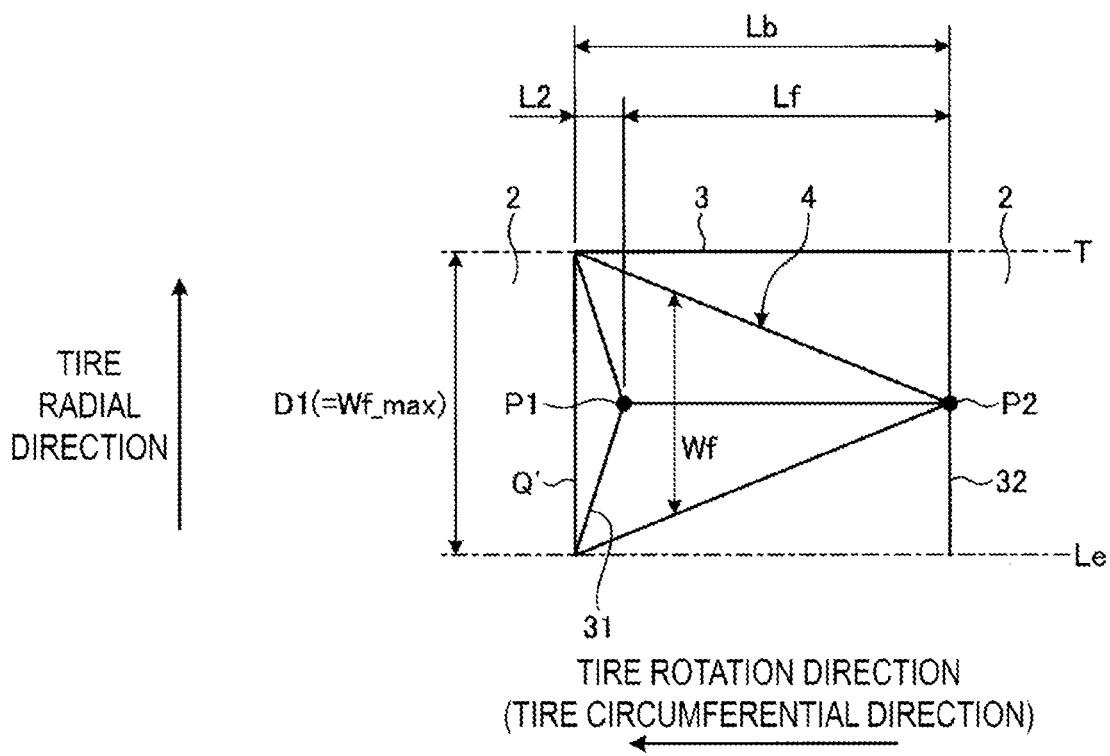
FIG. 12 is an explanatory diagram illustrating a modified example of the pneumatic tire illustrated in FIG. 2.

In contrast, in the configuration of FIG. 12, the maximum width position of the fin 4 is on an intersection line Q' between the plane X (see FIG. 2) and the groove wall of the lug groove 2, and the maximum projection position P1 of the fin 4 is located further on the ground contact trailing side in the tire rotation direction than the intersection line Q' on the ground contact leading side of the block 3. As a result, the distance L2 of the maximum projection position P1 of the fin 4 is L2<0. Even with such a configuration, the above conditions of the ratio L2/Lb are satisfied, and thus the function of the fin 4 is appropriately ensured.

Figure 13:
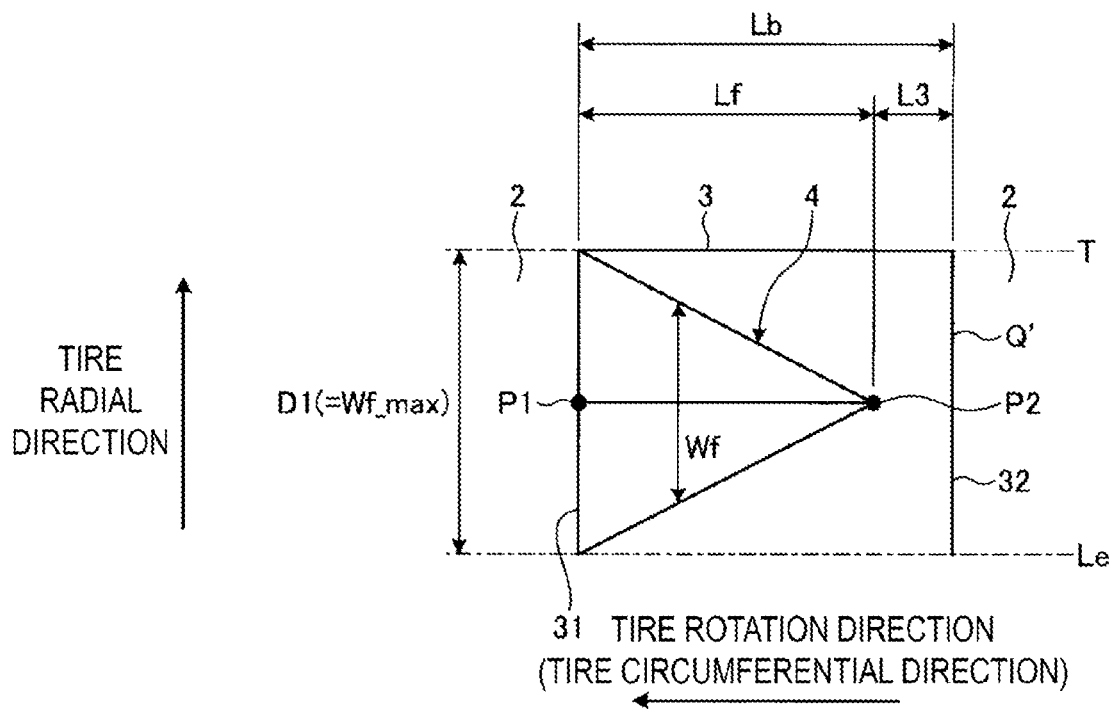
FIG. 13 is an explanatory diagram illustrating a modified example of the pneumatic tire illustrated in FIG. 2.

Additionally, in the configuration of FIG. 13, the fin 4 is shorter than the circumferential length Lb of the block 3, and the minimum projection position P2 of the fin 4 is located further on the ground contact leading side than the ground contact trailing side circumferential edge portion 32 of the block 3. Accordingly, the distance L3 of the minimum projection position P2 of the fin 4 is 0<L3. Even with such a configuration, the above conditions of the ratio L3/Lb are satisfied, and thus the function of the fin 4 is appropriately ensured.

Also, in the configuration of FIG. 2, as illustrated in FIG. 5, the fin 4 has a triangular shape in a plan view, and a minimum width Wf_min (dimension symbol omitted in the drawings) of the fin 4 at the ground contact trailing side end portion is Wf_min=0.

Figure 14:
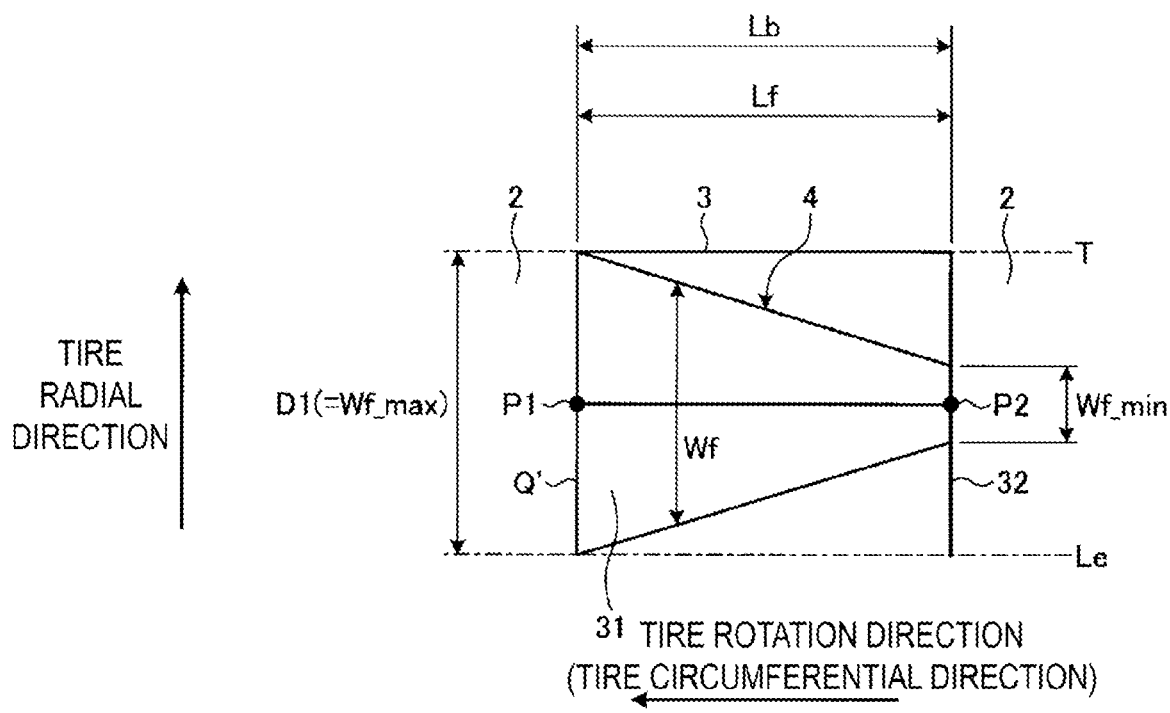
FIG. 14 is an explanatory diagram illustrating a modified example of the pneumatic tire illustrated in FIG. 2.

In contrast, in the configuration of FIG. 14, the fin 4 has a trapezoidal shape in a plan view, and the minimum width Wf_min of the fin 4 at the ground contact trailing side end portion is 0<Wf_min. In this case, the maximum width Wf_max on the ground contact leading side of the fin 4 and the minimum width Wf_min on the ground contact trailing side of the fin 4 preferably have the relationship 0<Wf_min/Wf_max≤0.50, and more preferably have the relationship 0<Wf_min/Wf_max≤0.10. Accordingly, the width Wf of the fin 4 appropriately decreases from the ground contact leading side toward the ground contact trailing side, and the effect of guiding air by the fin 4 is ensured.

Also, in the configuration of FIG. 2, as illustrated in FIG. 5, the minimum projection position P2 and the maximum projection position P1 of the fins 4A, 4B adjacent to each other with the lug groove 2 sandwiched therebetween are on the same position in the tire radial direction, and the distance D3 in the tire radial direction is D3=0.

Figure 15:
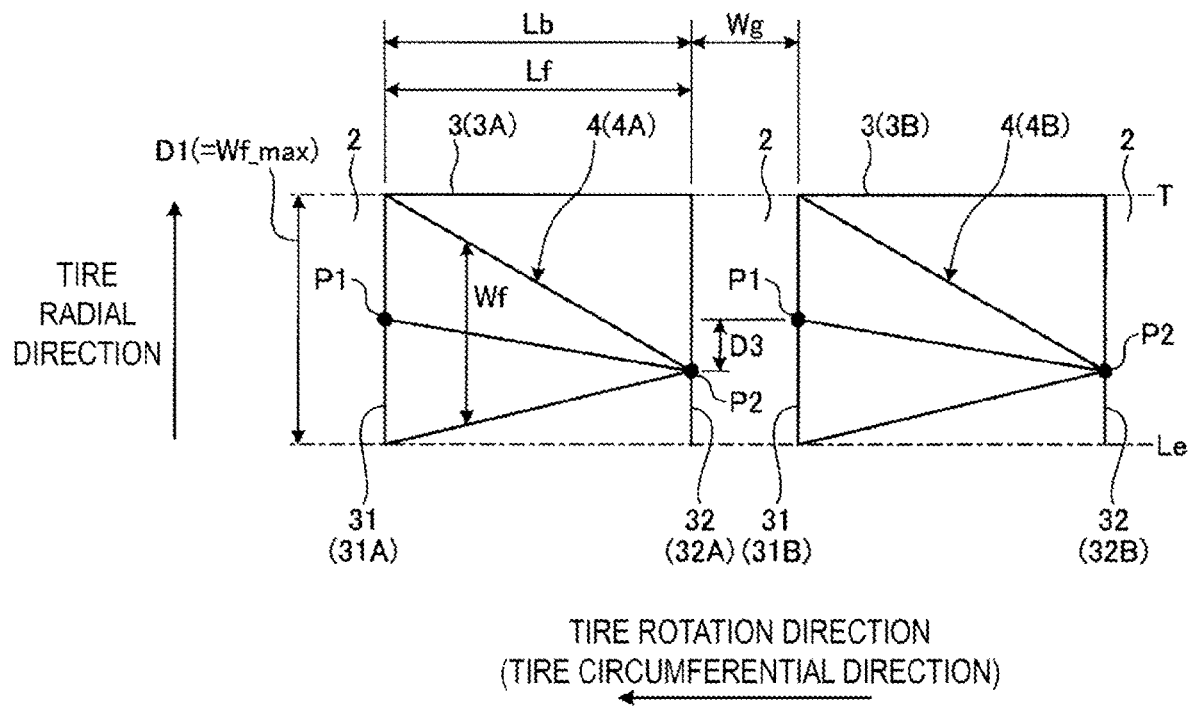
FIG. 15 is an explanatory diagram illustrating a modified example of the pneumatic tire illustrated in FIG. 2.

In contrast, in the configuration illustrated in FIG. 15, the fin 4 is inclined toward the inner side in the tire radial direction from the ground contact leading side toward the ground contact trailing side in the tire rotation direction. Accordingly, the distance D3 in the tire radial direction between the minimum projection position P2 and the maximum projection position P1 of the fins 4A, 4B adjacent to each other with the lug groove 2 sandwiched therebetween is 0<D3. As just described, a ground contact trailing side terminating end portion (minimum projection position P2) of the fin 4 may be located further on the inner side in the tire radial direction than the maximum projection position P1 (see FIG. 15), or may be located on an outer side in the tire radial direction (not illustrated).

Also, in the configuration of FIG. 2, as illustrated in FIG. 5, the maximum width Wf_max of the fin 4 in the tire radial direction is equal to the distance D1 in the tire radial direction from the tire ground contact edge T to the arc Le. Accordingly, the fin 4 extends across the entire region from the tire ground contact edge T to the arc Le.

Figure 16:
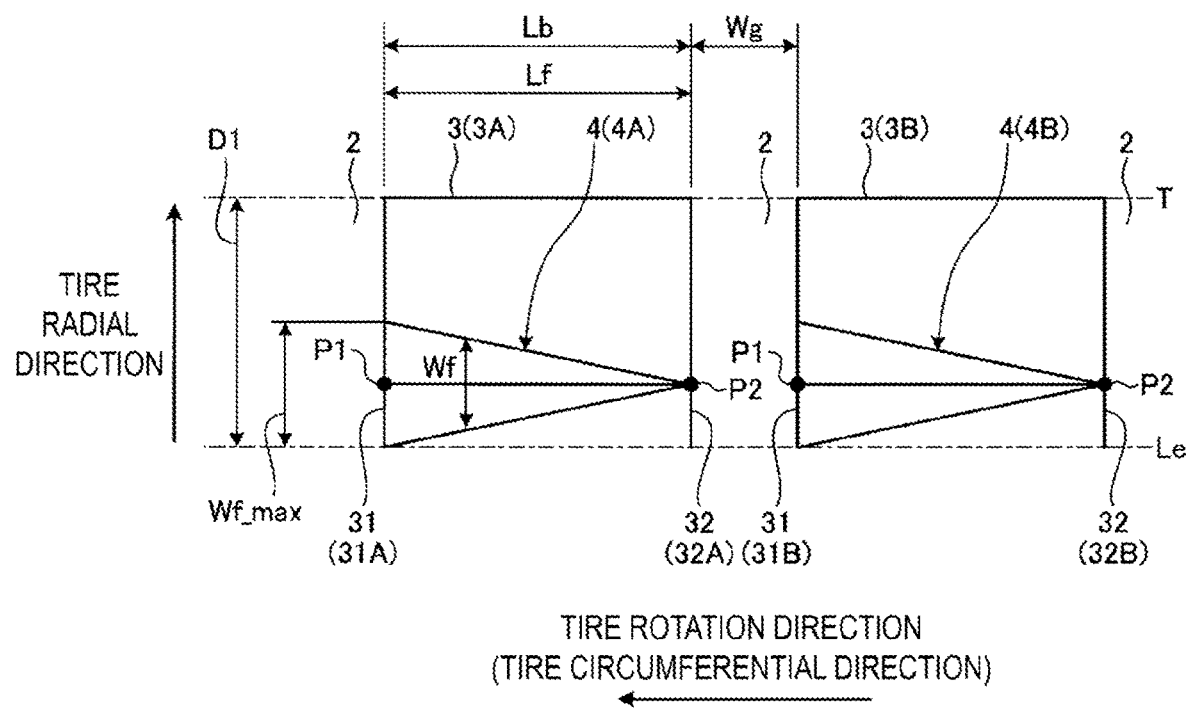
FIG. 16 is an explanatory diagram illustrating a modified example of the pneumatic tire illustrated in FIG. 2.

In contrast, in the configuration illustrated in FIG. 16, the maximum width Wf_max of the fin 4 is set to be smaller than the distance D1. Further, the maximum projection position P1 of the fin 4 is located further on the inner side in the tire radial direction than an intermediate point (not illustrated) of the distance D1. Furthermore, the fins 4A, 4B adjacent to each other with the lug groove 2 sandwiched therebetween are on the same position in the tire radial direction. Even with such a configuration, uneven wear of the block 3 can be suppressed while the function of the fin 4 is secured.

Also, in the configuration of FIG. 2, the fin 4 has a triangular pyramid shape. Accordingly, the ground contact leading side end surface of the fin 4 has a triangular shape in which the intersection line Q' between the plane X and the groove wall of the lug groove 2 is applied as the bottom side. Additionally, the ground contact trailing side end portion of the fin 4 converges to one point.

Figure 17:
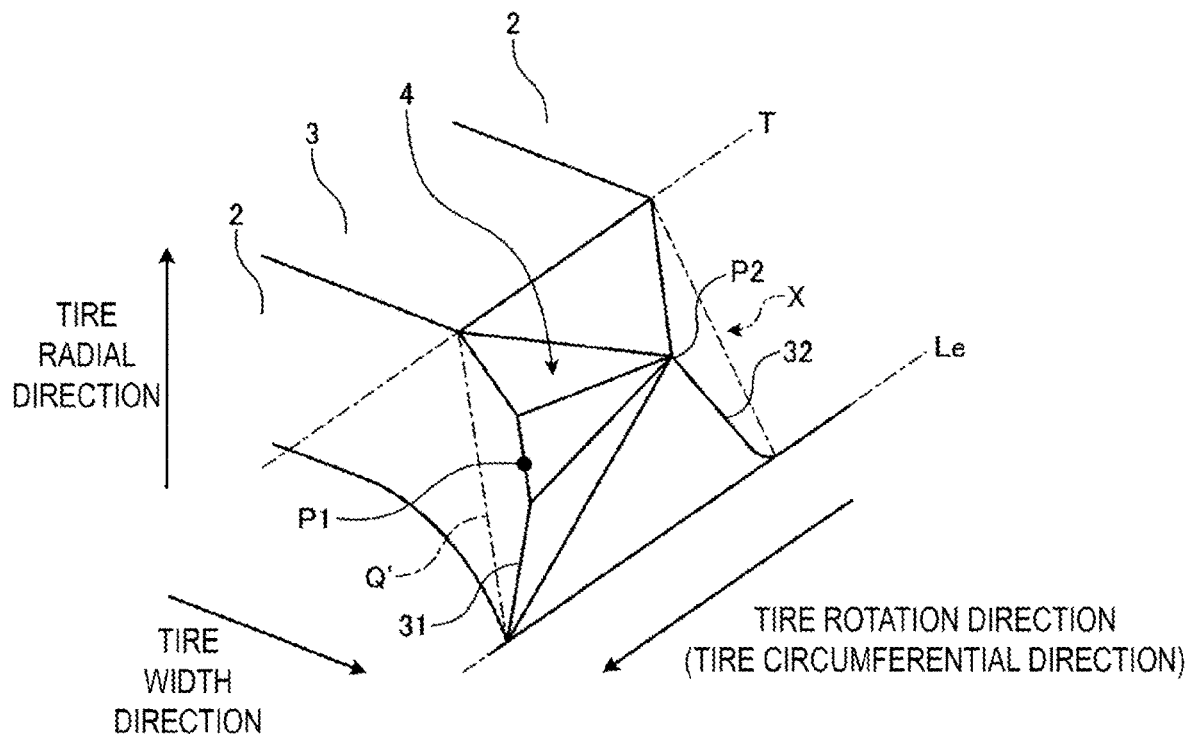
FIG. 17 is an explanatory diagram illustrating a modified example of the pneumatic tire illustrated in FIG. 2.
Figure 18:
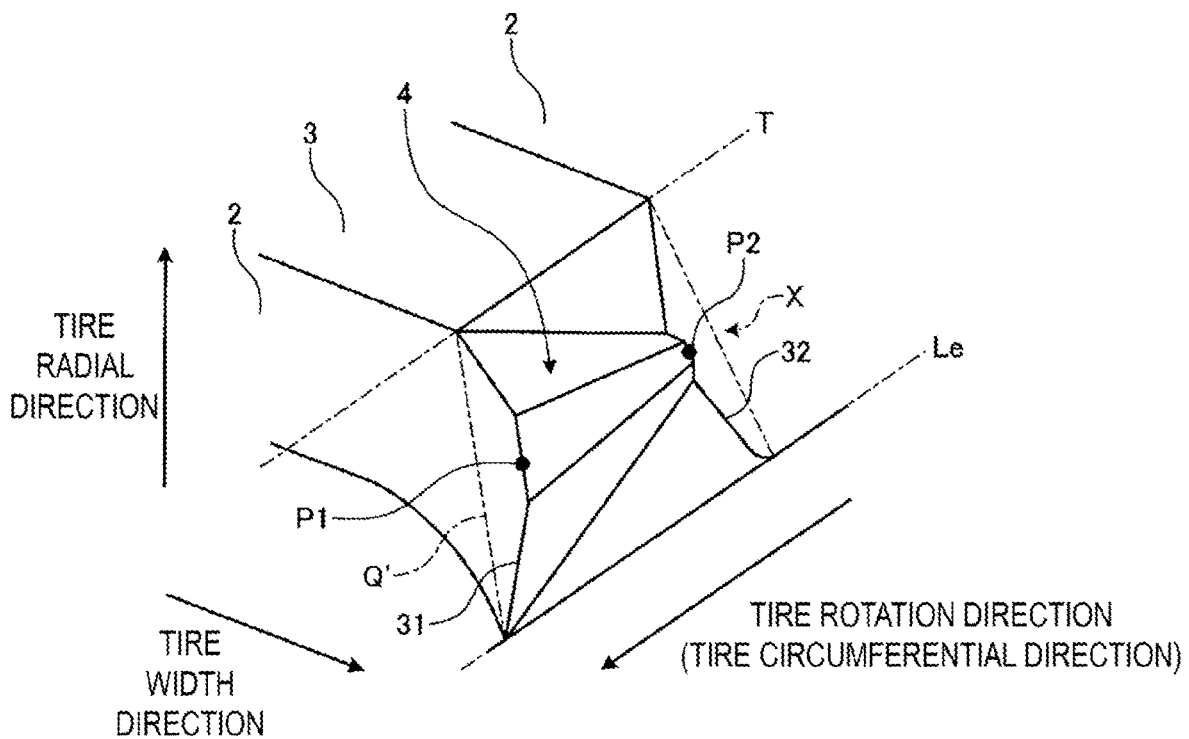
FIG. 18 is an explanatory diagram illustrating a modified example of the pneumatic tire illustrated in FIG. 2.

In contrast, in the configuration of FIG. 17, the fin 4 has a quadrangular pyramid shape, and the ground contact leading side end surface of the fin 4 has a quadrangular shape. Furthermore, in the configuration illustrated in FIG. 18, the fin 4 has a truncated quadrangular pyramid shape, and the ground contact trailing side end portion of the fin 4 projects with respect to the sidewall surface of the block 3. Even with such a configuration, the function of the fin 4 can be ensured. Note that in these configurations, the maximum projection position P1 and the minimum projection position P2 of the fin 4 are defined as a midpoint of the edge side for convenience.

Also, in the configuration of FIG. 2, as described above, a portion of the ground contact trailing side circumferential edge portion 32 of the block 3 is recessed toward the inner side in the tire width direction with respect to the plane X. Accordingly, the inflow of air from the fin 4 into the lug grooves 2 is facilitated.

Figure 19:
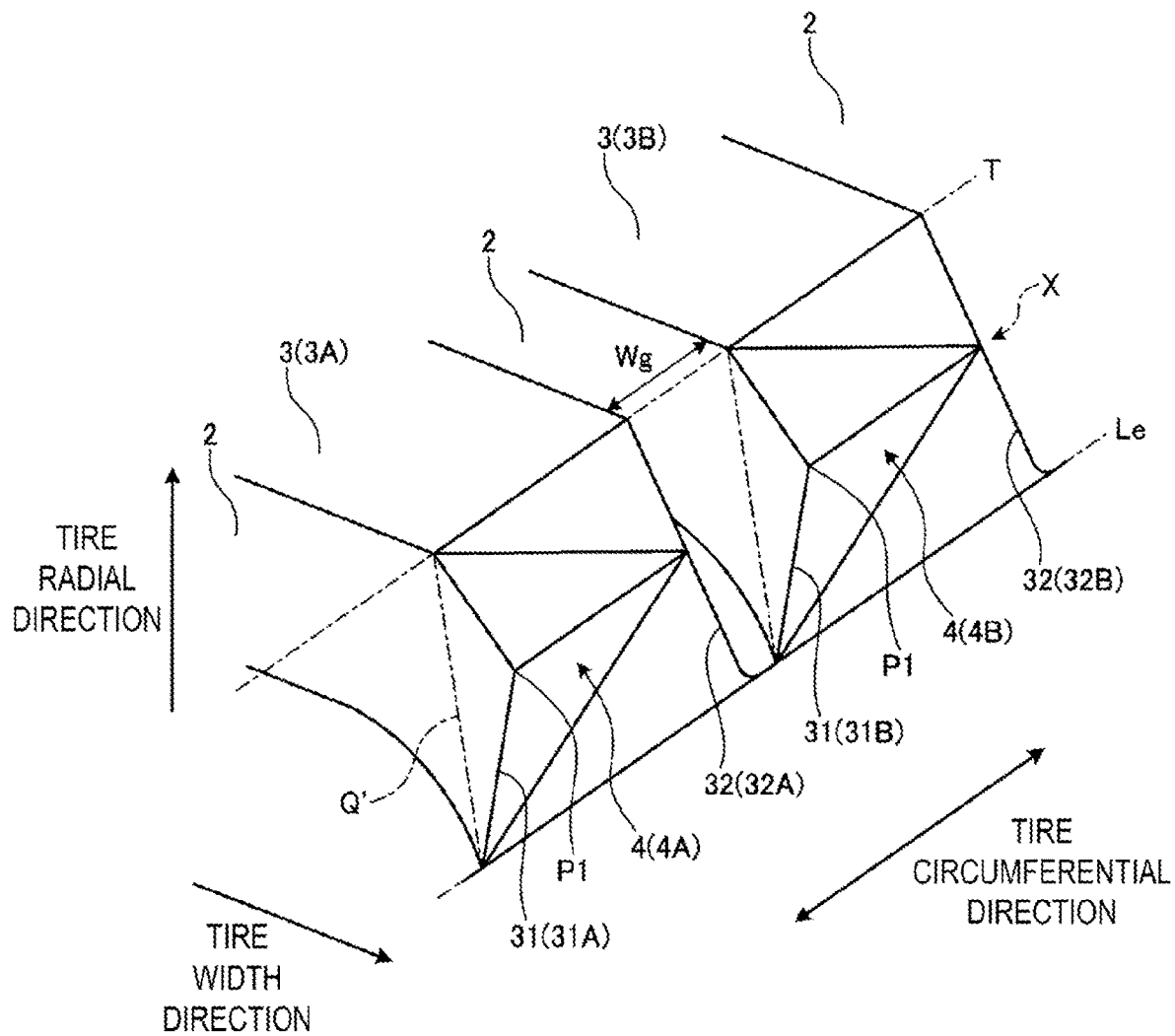
FIG. 19 is an explanatory diagram illustrating a modified example of the pneumatic tire illustrated in FIG. 2.

However, no such limitation is intended, and as illustrated in FIG. 19, the ground contact trailing side circumferential edge portion 32 of the block 3 may be flat with respect to the plane X.

Also, in the configuration of FIG. 2, each of the blocks 3A; 3B includes the single fin 4A; 4B, and the fins 4A, 4B of the adjacent blocks 3A, 3B are arranged such that the pyramid shapes face the same direction (that is, a direction in which the projection amount Hf tapers). In such a configuration, the tire rotation direction is set such that the bottom surface side of the pyramid shapes of the fins 4A, 4B is designated as the ground contact leading side in the tire rotation direction, and thus the inflow of air from the fin 4 into the lug groove 2 is facilitated. In addition, the effect of cooling the aforementioned tread portion can be attained.

Figure 20:
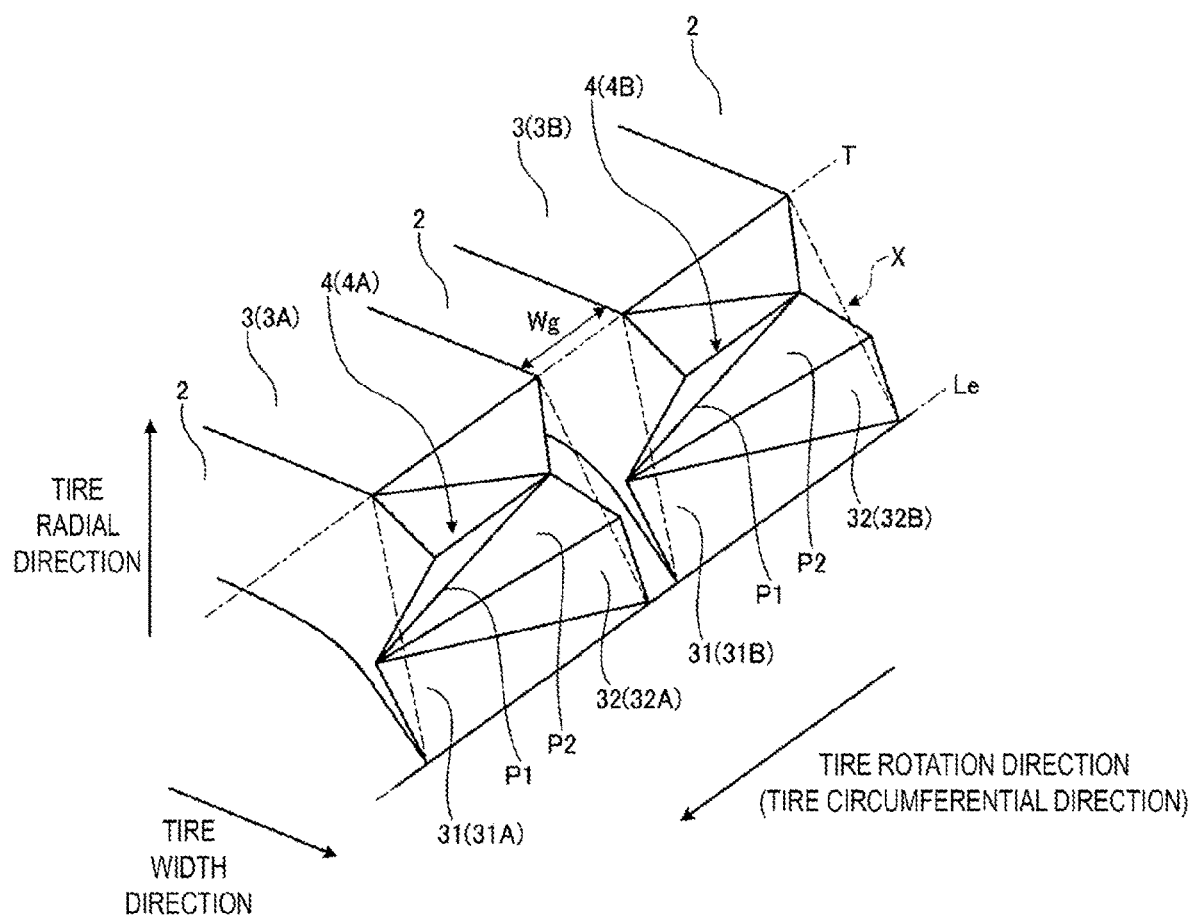
FIG. 20 is an explanatory diagram illustrating a modified example of the pneumatic tire illustrated in FIG. 2.
Figure 21:
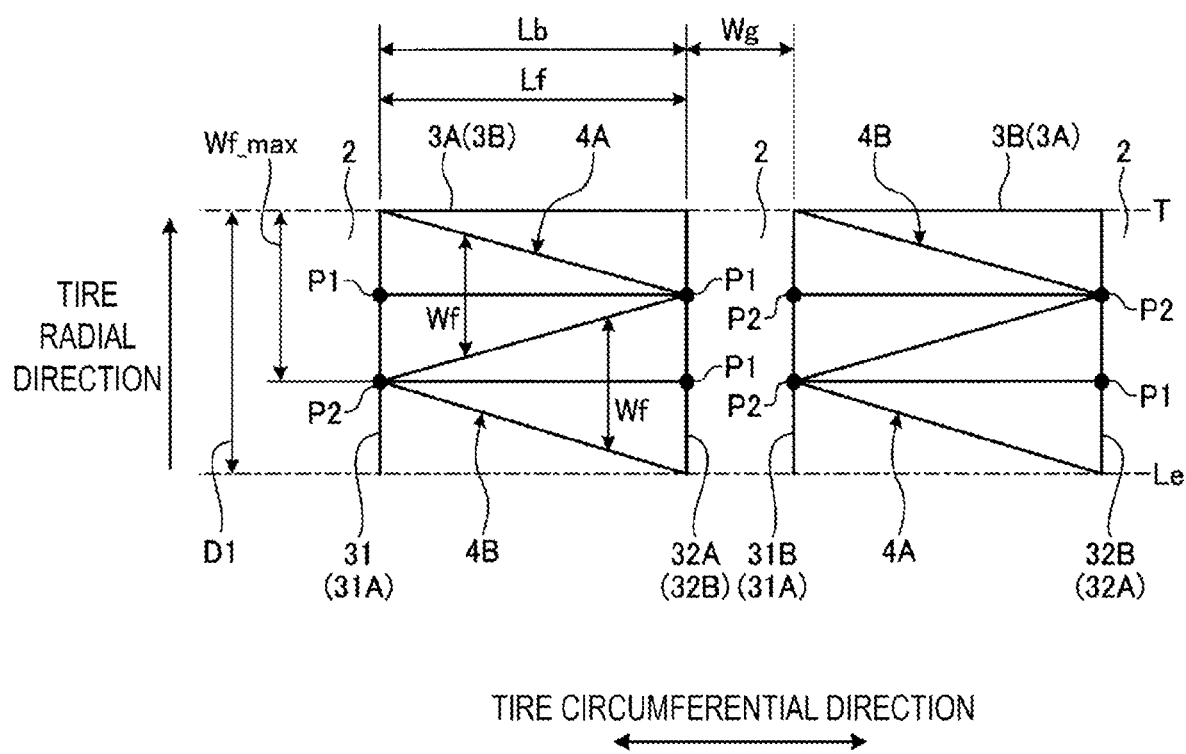
FIG. 21 is an explanatory diagram illustrating a modified example of the pneumatic tire illustrated in FIG. 2.

In contrast, in the configuration of FIGS. 20 and 21, each of the blocks 3A; 3B includes a pair of fins 4A, 4B arranged in the tire radial direction. Additionally, in each of the blocks 3A; 3B, the heights of the pair of fins 4A, 4B; 4B, 4A taper in mutually different directions in the tire circumferential direction. Specifically, in the adjacent blocks 3A, 3B, the fins 4A, 4B on the outer side in the tire radial direction are disposed such that the pyramid shapes are arranged facing one direction in the tire circumferential direction, and the fins 4B, 4A on the inner side in the tire radial direction are disposed such that the pyramid shapes are arranged facing the other direction in the tire circumferential direction.

In the configuration described above, in a case where the lower left side of FIG. 20 is the ground contact leading side in the tire rotation direction, the fins 4A, 4B on the outer side in the tire radial direction of the blocks 3A, 3B exert the effect of guiding air (see FIG. 2), and thus the inflow of air into guide groove 2 is facilitated. Also, in a case where the upper right side of FIG. 20 is the ground contact leading side in the tire rotation direction, the fins 4B, 4A on the inner side in the tire radial direction of the blocks 3A, 3B exert the effect of guiding air, and thus the inflow of air into the lug groove 2 is facilitated. As a result, the inflow of air from the fin 4 into the lug groove 2 is facilitated in any tire rotation direction, and thus the effect of cooling the aforementioned tread portion is attained.

Note that in the configuration of FIGS. 20 and 21, the fins 4A, 4B; 4B, 4A of the respective blocks 3A; 3B are disposed adjacent in the tire radial direction. However, no such limitation is intended, and the fins 4A, 4B adjacent in the tire radial direction may be disposed separated from each other (not illustrated).

Effect

As described above, the pneumatic tire 1 includes the plurality of lug grooves 2 extending in the tire width direction and opening to the buttress portion, and the first and second blocks 3A, 3B adjacent to each other with the single lug groove 2 sandwiched therebetween (see FIG. 2). Further, the pneumatic tire 1 includes the fins 4A, 4B disposed on the sidewall surfaces of the blocks 3A, 3B and extending in the tire circumferential direction. Furthermore, the local plane X is defined that includes the ground contact edge of the first and second blocks 3A, 3B and the arc connecting the opening end portions of the three lug grooves 2 that define the first and second blocks 3A, 3B. At this time, the fins 4A, 4B of the first and second blocks 3A, 3B extend the groove walls of the lug grooves 2 further toward the outer side in the tire width direction than the plane X via the one circumferential edge portions 31A, 31B of the blocks 3A, 3B (see FIG. 4). Also, the projection amount Hf (see FIG. 4) of the fins 4A, 4B with respect to the plane X tapers from the one circumferential edge portions 31A, 31B of the blocks 3A, 3B toward the other circumferential edge portions 32A, 32B of the blocks 3A, 3B.

In such a configuration, when the tire is rotating, the air on the sidewall surface of the first block 3A on the ground contact leading side is guided by the fin 4A to flow toward the second block 3B on the ground contact trailing side. At this time, since the projection amount Hf of the fin 4A tapers from the ground contact leading side toward to the ground contact trailing side of the block 3A, separation of the air flow from the sidewall surface of the fin 4A is suppressed, and thus the air is efficiently guided. Then, a portion of the air contacts the groove walls of the lug groove 2 between the blocks 3A, 3B to flow into the lug groove 2. At this time, since the fin 4B of the second block 3B extends the groove wall of the lug groove 2 toward the outer side in the tire width direction via the ground contact leading side circumferential edge portion 31B of the block 3B, the inflow of air into the lug groove 2 is facilitated by the extended portion of the groove wall. Accordingly, it is advantageous that the tread portion of the tire is efficiently cooled and thus the increase in the temperature of the tire is effectively suppressed.

In addition, in the pneumatic tire 1, in the cross-sectional view that includes the maximum projection position P1 of the fin 4 and is perpendicular to the plane X and parallel to the tire circumferential direction, the distance Da in the tire width direction from the other circumferential edge portion 32A of the first block 3A to the maximum projection position P1 of the fin 4B of the second block 3B (see FIG. 4) and the circumferential length Lb of the block 3A at the tire ground contact edge T have the relationship $0.10 \leq Da/Lb \leq 1.50$. Accordingly, it is advantageous that the offset amount (i.e., the distance Da) between the circumferential edge portions 32A, 31B of the blocks 3A, 3B is appropriately set. In other words, with the lower limit described above, the offset amount between the circumferential edge portions 32A, 31B is ensured, and thus the inflow of air from the fin 4A into the lug groove 2 is facilitated. In addition, with the upper limit described above, uneven wear of the blocks 3A, 3B caused when the offset amount between the circumferential edge portions 32A, 31B is excessively large is suppressed.

Further, in the pneumatic tire 1, the distance D2 in the tire radial direction from the tire ground contact edge T to the maximum projection position P1 of the fin 4 (see FIG. 3) has the relationship $0.20 \leq D2/Hg$ with respect to the groove depth Hg of the lug groove 2 at the tire ground contact edge T. Accordingly, it is advantageous that the maximum projection position P1 of the fin 4 is appropriately set and the inflow of air from the fin 4 into the lug groove 2 is thus facilitated.

Furthermore, in the pneumatic tire 1, the maximum projection amount Hf_max of the fin 4 with respect to the plane X (see FIG. 4) is in the range 1.0 mm≤Hf_max≤50 mm. Accordingly, it is advantageous that the maximum projection position P1 of the fin 4 is appropriately set. In other words, with the lower limit described above, the maximum projection amount Hf_max of the fin 4 is ensured, and thus the effect of guiding air by the fin 4 is ensured. In addition, with the upper limit described above, uneven wear of the block 3 caused by the arrangement of the fins 4 is suppressed.

Additionally, in the pneumatic tire 1, in the cross-sectional view that includes the maximum projection position P1 of the fin 4 and is perpendicular to the plane X and parallel to the tire circumferential direction (see FIG. 4), the distance L1 in the tire circumferential direction from the intersection point Q between the plane X and the groove wall of the lug groove 2 to the maximum projection position P1 of the fin 4; and the maximum projection amount Hf_max of the fin 4 preferably have the relationship −0.20≤L1/Hf_max≤0.20. Accordingly, it is advantageous that the inclination of the groove wall portion, which is extended by the fin 4, of the lug groove 2 is appropriately set and the inflow of air from the fin 4 into the lug groove 2 is thus facilitated.

Moreover, in the pneumatic tire 1, the maximum width Wf_max in the tire radial direction of the fin 4 (see FIG. 5) has the relationship 0.50≤Wf_max/D1 with respect to the distance D1 in the tire radial direction from the tire ground contact edge T to the arc Le. Accordingly, it is advantageous that the maximum width Wf_max of the fin 4 is ensured and thus the effect of guiding air by the fins 4 is ensured.

Additionally, in the pneumatic tire 1, the circumferential length Lf (see FIG. 5) of the fin 4 and the circumferential length Lb of the block 3 at the tire ground contact edge T have the relationship 0.50≤Lf/Lb≤1.00. Accordingly, it is advantageous that the circumferential length Lf of the fin 4 is ensured and thus the effect of guiding air by the fin 4 is ensured.

Further, in the pneumatic tire 1, the distance D3 in the tire radial direction between the minimum projection position P2 of the fin 4A of the first block 3A and the maximum projection position P1 of the fin 4B of the second block 3B have the relationship 0≤D3/D1≤0.80 with respect to the distance D1 in the tire radial direction from the tire ground contact edge T to the arc Le (see FIG. 5). Accordingly, it is advantageous that the positional relationship between the minimum projection position P2 and the maximum projection position P1 of the fins 4A, 4B adjacent to each other with the lug groove 2 sandwiched therebetween is appropriately set and thus the effect of guiding air by the fin 4 is ensured.

Furthermore, in the pneumatic tire 1, the width Wf of the fin 4 tapers from the one circumferential edge portion 31 to the other circumferential edge portion 32 of the block 3 (see FIG. 5). Accordingly, it is advantageous that the air flow on the sidewall surface of the block 3 is consolidated by the fin 4 and thus the air is efficiently guided.

Additionally, in the pneumatic tire 1, the maximum width Wf_max (see FIG. 5) and the minimum width Wf_min (dimension symbol omitted in the drawings) of the fin 4 have the relationship 0≤Wf_min/Wf_max≤0.50. Accordingly, it is advantageous that the shape in the width direction of the fin 4 is appropriately set and thus the effect of guiding air by the fin 4 is improved.

Moreover, in the pneumatic tire 1, the fin 4 has a cone shape or a truncated pyramid shape having the cross-sectional area narrowing from the one circumferential edge portion 31 to the other circumferential edge portion 32 of the block 3 (see FIG. 2). Accordingly, it is advantageous that the shape of the fin 4 is appropriately set and thus the effect of guiding air by the fin 4 is improved.

Further, in the pneumatic tire 1, in the cross-sectional view that includes the maximum projection position P1 of the fin 4 and is perpendicular to the plane X and parallel to the tire circumferential direction, the offset amount Di toward the inner side in the tire width direction from the plane X to the other circumferential edge portion 32A of the block 3 is in the range 0≤Di/Lb≤1.00 with respect to the circumferential length Lb of the block at the tire ground contact edge T (see FIG. 4). In such a configuration, it is advantageous that at least a portion of the other circumferential edge portion 32A of the block 3 is offset to the inner side in the tire width direction and thus the inflow of air from the buttress portion into the lug groove 2 is facilitated.

Furthermore, in the pneumatic tire 1, the projection amounts Hf of the first and second fins 4A, 4B taper in mutually different directions in the tire circumferential direction (see FIGS. 20 and 21). In such a configuration, it is advantageous that the inflow of air from the fin 4 into the lug groove 2 is facilitated in any tire rotation direction and thus the effect of cooling the tread portion is attained.

Additionally, in the pneumatic tire 1, the groove depth Hg (see FIG. 3) of the lug groove 2 at the tire ground contact edge T is in the range 20 mm≤Hg≤180 mm. By taking a tire (in particular, a tire for a construction vehicle) having such a deep lug groove 2 as an applicable target, it is advantageous that the effect of cooling the tread portion by the fins 4 is effectively attained.

Moreover, in the pneumatic tire 1, the distance D1 in the tire radial direction from the tire ground contact edge T to the arc Le (see FIG. 3) is in the range 35 mm≤D1. By taking a tire (in particular, a tire for a construction vehicle) having such a wide buttress portion as an applicable target, it is advantageous that the effect of cooling the tread portion by the fin 4 is effectively attained.

EXAMPLES

Figure 23:
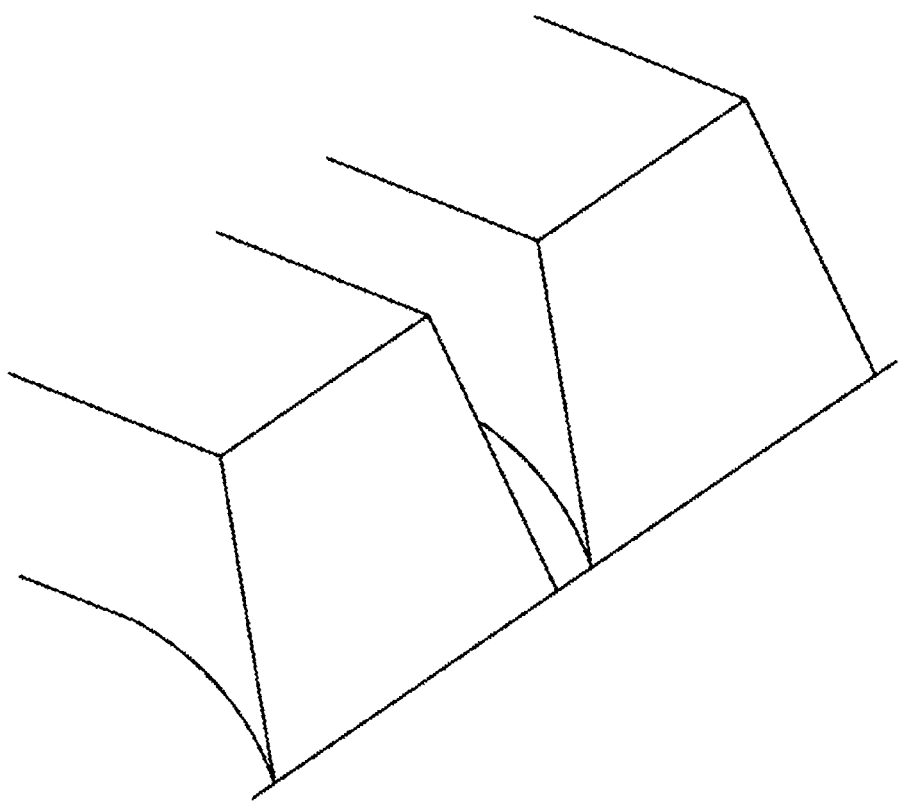
FIG. 23 is an explanatory diagram illustrating a pneumatic tire of Conventional Example.

FIG. 22 is a table indicating the results of performance tests of pneumatic tires according to embodiments of the technology. FIG. 23 is an explanatory diagram illustrating a pneumatic tire of Conventional Example.

In the performance tests, (1) cooling performance of the tread portion and (2) uneven wear resistance performance were evaluated for a plurality of types of test tires. Further, test tires having a tire size of 2700R49 are mounted on rims specified by JATMA, and an internal pressure of 700 kPa and a load of 267.23 kN are applied to the test tires. Further, the test tires are mounted on all wheels of a construction vehicle that is a test vehicle.

(1) The evaluation of cooling performance of the tread portion is performed by measuring temperature of the tire inner surface of the tread portion before and after the test vehicle is driven for 60 minutes at a traveling speed of 10 km/h. Then, index values are evaluated based on the measurement results with Conventional Example being assigned as the reference (100). In this evaluation, larger values indicate a smaller increase in the temperature of the tread portion, which is preferable.

(2) In the evaluation of uneven wear resistance performance, the test vehicle (dump truck) is driven for 1000 hours on a surface mine site. Then, uneven wear of the shoulder blocks of the test tire are observed, and index values are evaluated with Conventional Example being assigned as the reference (100). In this evaluation, larger values are preferable, and a value of 95 or greater indicates that the tire is appropriately maintained.

The test tire of Example has the configurations of FIGS. 1 and 2 and includes the fins 4 on the sidewall surfaces of the blocks 3. Additionally, the circumferential length Lb of the block 3 at the tire ground contact edge T is 200 mm, and the groove depth Hg of the lug groove 2 is 100 mm.

The test tire of Conventional Example has the configuration illustrated in FIG. 23 and does not include the fins 4 in FIG. 2.

As can be seen from the test results, the test tire of Example provides cooling performance and uneven wear resistance performance for a tire in a compatible manner.

The invention claimed is:

1. A pneumatic tire, comprising:
   a plurality of lug grooves extending in a tire width direction and opening to a buttress portion; and first and second blocks that are adjacent to each other and defined by three of the lug grooves with one of the lug grooves sandwiched therebetween,
   the pneumatic tire comprising fins each disposed on a sidewall surface of each block and extending in a tire circumferential direction,
   a plane being defined that is local and comprises a ground contact edge of the first and second blocks and an arc connecting opening end portions of the three of the lug grooves that define the first and second blocks,
   the fin of each of the first and second blocks extending a groove wall of a lug groove further toward an outer side in the tire width direction than the plane via one circumferential edge portion of the block,
   a projection amount of the fin with respect to the plane tapering from the one circumferential edge portion toward an other circumferential edge portion of the block, and
   a circumferential length Lf of the fin and a circumferential length Lb of the block at the tire ground contact edge having a relationship $0.77 \leq Lf/Lb \leq 1.00$.

2. The pneumatic tire according to claim 1, wherein in a cross-sectional view that has a maximum projection position of the fin and is perpendicular to the plane and parallel to the tire circumferential direction, a distance Da in the tire width direction, the distance Da from the other circumferential edge portion of the first block to the maximum projection position of the fin of the second block, and a circumferential length Lb of the block at the tire ground contact edge have a relationship $0.10 \leq Da/Lb \leq 1.50$.

3. The pneumatic tire according to claim 1, wherein a distance D2 in a tire radial direction from the tire ground contact edge to a maximum projection position of the fin has a relationship $0.20 \leq D2/Hg$ with respect to a groove depth Hg of the lug groove at the tire ground contact edge.

4. The pneumatic tire according to claim 1, wherein a maximum projection amount Hf_max of the fin with respect to the plane is in a range $1.0 \text{ mm} \leq Hf\_max \leq 50 \text{ mm}$.

5. The pneumatic tire according to claim 1, wherein in a cross-sectional view that has a maximum projection position of the fin and is perpendicular to the plane and parallel to the tire circumferential direction, a distance L1 in the tire circumferential direction, the distance L1 from an intersection point between the plane and the groove wall of the lug groove to the maximum projection position of the fin, and a maximum projection amount Hf_max of the fin have a relationship $-0.20 \leq L1/Hf\_max \leq 0.20$.

6. The pneumatic tire according to claim 1, wherein a maximum width Wf_max of the fin in a tire radial direction has a relationship $0.50 \leq Wf\_max/D1$ with respect to a distance D1 in the tire radial direction from the tire ground contact edge to the arc.

7. The pneumatic tire according to claim 1, wherein a distance D3 in a tire radial direction between a minimum projection position of the fin of the first block and a maximum projection position of the fin of the second block has a relationship $0 \leq D3/D1 \leq 0.80$ with respect to a distance D1 in the tire radial direction from the tire ground contact edge to the arc.

8. The pneumatic tire according to claim 1, wherein a width of the fin tapers from the one circumferential edge portion to the other circumferential edge portion of the block.

9. The pneumatic tire according to claim 8, wherein a maximum width Wf_max and a minimum width Wf_min of the fin have a relationship $0 < Wf\_min/Wf\_max \leq 0.50$.

10. The pneumatic tire according to claim 1, wherein the fin has a cone shape or a truncated pyramid shape having a cross-sectional area narrowing from the one circumferential edge portion to the other circumferential edge portion of the block.

11. The pneumatic tire according to claim 1, wherein in a cross-sectional view that has a maximum projection position of the fin and is perpendicular to the plane and parallel to the tire circumferential direction, an offset amount Di toward an inner side in the tire width direction from the plane to the other circumferential edge portion of the block is in a range $0 \leq Di/Lb \leq 1.00$ with respect to a circumferential length Lb of the block at a tire ground contact edge.

12. The pneumatic tire according to claim 1, wherein each one of the blocks comprises first and second fins arranged in a tire radial direction, and
   heights of the first and second fins taper in mutually different directions in the tire circumferential direction.

13. The pneumatic tire according to claim 1, wherein a groove depth Hg of the lug groove at the tire ground contact edge is in a range $20 \text{ mm} \leq Hg \leq 180 \text{ mm}$.

14. The pneumatic tire according to claim 1, wherein a distance D1 in a tire radial direction from the tire ground contact edge to the arc is in a range $35 \text{ mm} \leq D1$.

15. A pneumatic tire, comprising:
   a plurality of lug grooves extending in a tire width direction and opening to a buttress portion; and first and second blocks that are adjacent to each other and defined by three of the lug grooves with one of the lug grooves sandwiched therebetween,
   the pneumatic tire comprising fins each disposed on a sidewall surface of each block and extending in a tire circumferential direction,
   a plane being defined that is local and comprises a ground contact edge of the first and second blocks and an arc connecting opening end portions of the three of the lug grooves that define the first and second blocks,
   the fin of each of the first and second blocks extending a groove wall of a lug groove further toward an outer side in the tire width direction than the plane via one circumferential edge portion of the block,
   a projection amount of the fin with respect to the plane tapering from the one circumferential edge portion toward an other circumferential edge portion of the block, and
   in a cross-sectional view that has a maximum projection position of the fin and is perpendicular to the plane and parallel to the tire circumferential direction, an offset amount Di toward an inner side in the tire width direction from the plane to the other circumferential edge portion of the block being in a range $0.02 \leq Di/Lb \leq 1.00$ with respect to a circumferential length Lb of the block at a tire ground contact edge.

16. A pneumatic tire, comprising:
a plurality of lug grooves extending in a tire width direction and opening to a buttress portion; and first and second blocks that are adjacent to each other and defined by three of the lug grooves with one of the lug grooves sandwiched therebetween,
the pneumatic tire comprising fins each disposed on a sidewall surface of each block and extending in a tire circumferential direction,
a plane being defined that is local and comprises a ground contact edge of the first and second blocks and an arc connecting opening end portions of the three of the lug grooves that define the first and second blocks,
the fin of each of the first and second blocks extending a groove wall of a lug groove further toward an outer side in the tire width direction than the plane via one circumferential edge portion of the block,
a projection amount of the fin with respect to the plane tapering from the one circumferential edge portion toward an other circumferential edge portion of the block,
each one of the blocks comprising first and second fins arranged in a tire radial direction, and
heights of the first and second fins tapering in mutually different directions in the tire circumferential direction.

* * * * *